US012709117B2

(12) United States Patent
Ishizu et al.

(10) Patent No.: US 12,709,117 B2
(45) Date of Patent: Aug. 18, 2026

(54) TIRE

(71) Applicant: The Yokohama Rubber Co., LTD., Tokyo (JP)

(72) Inventors: Kento Ishizu, Kanagawa (JP); Yoshifumi Koishikawa, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 233 days.

(21) Appl. No.: 17/907,638

(22) PCT Filed: Apr. 2, 2021

(86) PCT No.: PCT/JP2021/014346
§ 371 (c)(1),
(2) Date: Sep. 28, 2022

(87) PCT Pub. No.: WO2021/201283
PCT Pub. Date: Oct. 7, 2021

(65) Prior Publication Data

US 2023/0125096 A1 Apr. 27, 2023

(30) Foreign Application Priority Data

Apr. 3, 2020 (JP) ................................ 2020-067539

(51) Int. Cl.
*B60C 11/12* (2006.01)
*B60C 11/03* (2006.01)

(52) U.S. Cl.
CPC ... *B60C 11/1236* (2013.01); *B60C 2011/0341* (2013.01); *B60C 2011/0381* (2013.01)

(58) Field of Classification Search
CPC ..... B60C 2011/0381; B60C 2011/1245; B60C 11/1236; B60C 2011/129; B60C 2011/1295
See application file for complete search history.

(56) References Cited

U.S. PATENT DOCUMENTS

2016/0185160 A1* 6/2016 Mukai ................. B60C 11/1307 152/209.24
2018/0015787 A1* 1/2018 Hayashi .............. B60C 11/1369
(Continued)

FOREIGN PATENT DOCUMENTS

JP 4149041 B2 9/2008
JP 4466765 B2 5/2010
(Continued)

OTHER PUBLICATIONS

JP 2019-043306 Machine Translation; Yasunaga, Tomokazu (Year: 2019).*

*Primary Examiner* — Justin R Fischer
*Assistant Examiner* — Nicholas J Weiler
(74) *Attorney, Agent, or Firm* — Thorpe North & Western

(57) ABSTRACT

In a tire, an outermost circumferential groove is on the outermost side in the width direction, a center land portion and center lug grooves are on an inner side of the outermost circumferential groove in the width direction, the center lug grooves include an end opening to the outermost circumferential groove, a width-direction sipe and a circumferential sipe are on an individual side of both sides in the circumferential direction of a center lug groove of an individual pair of the center lug grooves adjacent in the circumferential direction, the width-direction sipe includes one end opening to the outermost circumferential groove to which the center lug groove opens and the other end terminating within the center land portion, and the circumferential sipe includes one end opening to the center lug groove and the other end terminating near the width-direction sipe or communicating with the width-direction sipe.

26 Claims, 9 Drawing Sheets

(56) References Cited

U.S. PATENT DOCUMENTS

| | | | | |
|---|---|---|---|---|
| 2018/0370290 | A1* | 12/2018 | Hirosue | B60C 11/1263 |
| 2019/0308463 | A1* | 10/2019 | Nagase | B60C 11/1263 |

FOREIGN PATENT DOCUMENTS

| | | | | | |
|---|---|---|---|---|---|
| JP | 2010-143377 | A | | 7/2010 | |
| JP | 2010-247711 | A | | 11/2010 | |
| JP | 4577455 | B1 | | 11/2010 | |
| JP | 2016-159665 | A | | 9/2016 | |
| JP | 2017-226367 | A | | 12/2017 | |
| JP | 2019043306 | A | * | 3/2019 | B60C 11/1259 |
| JP | 2019-104292 | A | | 6/2019 | |
| JP | 2019-182204 | A | | 10/2019 | |
| JP | 2019-182207 | A | | 10/2019 | |
| WO | WO 2015/133054 | A1 | | 9/2015 | |

* cited by examiner

12(11)
11
L
θ d
31b
32b
E
31(30)
25
31c
θ c
32c
32(30)
D
TIRE
CIRCUMFERENTIAL
DIRECTION
16(15)
32(30)
D
32c
θ c
31(30)
16a
31c
31b,32b
25
θ d
Wb
21(20)
3

12(11)
11
Wb
L
31b
25
32b
31(30)
32(30)
D
TIRE
CIRCUMFERENTIAL
DIRECTION
16(15)
D
32(30)
31(30)
31b
16a
32b
25
21(20)
3

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| WIDTH-DIRECTION SIPE AND CIRCUMFERENTIAL SIPE PROVIDED IN BOTH SIDES OF CENTER LUG GROOVE | YES | YES | YES | YES | YES | YES | YES | YES | YES |
| WIDTH-DIRECTION SIPE AND CIRCUMFERENTIAL SIPE PROVIDED IN BOTH SIDES OF EACH OF A PAIR OF ADJACENT CENTER LUG GROOVES | NO | YES | YES | YES | YES | YES | YES | V | YES |
| RATIO (Lw/Wb) OF LENGTH Lw OF WIDTH-DIRECTION SIPE TO WIDTH Wb OF CENTER LAND PORTION | 0.2 | 0.2 | 0.3 | 0.5 | 0.5 | 0.5 | 0.5 | 0.5 | 0.5 |
| ANGLE θw OF WIDTH-DIRECTION SIPE WITH RESPECT TO ANGLE θ OF CENTER LUG GROOVE | θw = 0 + 20° | θw = 0 + 20° | θw = 0 + 20° | θw = 0 + 20° | θw = 0 + 10° | θw = θ | θw = θ | θw = θ | θw = θ |
| RATIO (K/Hb) OF DISTANCE K BETWEEN WIDTH-DIRECTION SIPE AND CENTER LUG GROOVE TO WIDTH Hb OF CENTER LUG GROOVE | 1.2 | 1.2 | 1.2 | 1.2 | 1.2 | 1.2 | 1.0 | 0.9 | 1.0 |
| DISTANCE K BETWEEN WIDTH-DIRECTION SIPE AND CENTER LUG GROOVE | 20 mm | 15 mm | 15 mm | 15 mm | 15 mm | 15 mm | 10 mm | 10 mm | 7 mm |
| ANGLE θc OF WIDTH-DIRECTION SIPE WITH RESPECT TO CIRCUMFERENTIAL SIPE | 20° | 20° | 20° | 20° | 20° | 20° | 20° | 20° | 20° |
| RATIO (D/Wb) OF DISTANCE D OF CIRCUMFERENTIAL SIPE FROM CIRCUMFERENTIAL GROOVE TO WIDTH Wb OF CENTER LAND PORTION | 0.9 | 0.9 | 0.9 | 0.9 | 0.9 | 0.9 | 0.9 | 0.9 | 0.9 |
| PERFORMANCE ON ICE AND SNOW | 100 | 101 | 102 | 103 | 104 | 105 | 106 | 105 | 106 |

FIG. 8A

| | EXAMPLE 9 | EXAMPLE 10 | EXAMPLE 11 | EXAMPLE 12 | EXAMPLE 13 | EXAMPLE 14 | EXAMPLE 15 | EXAMPLE 16 | EXAMPLE 17 |
|---|---|---|---|---|---|---|---|---|---|
| WIDTH-DIRECTION SIPE AND CIRCUMFERENTIAL SIPE PROVIDED IN BOTH SIDES OF CENTER LUG GROOVE | YES | YES | YES | YES | YES | YES | YES | YES | YES |
| WIDTH-DIRECTION SIPE AND CIRCUMFERENTIAL SIPE PROVIDED IN BOTH SIDES OF EACH OF A PAIR OF ADJACENT CENTER LUG GROOVES | YES | YES | YES | YES | YES | YES | YES | YES | YES |
| RATIO (Lw/Wb) OF LENGTH Lw OF WIDTH-DIRECTION SIPE TO WIDTH Wb OF CENTER LAND PORTION | 0.5 | 0.5 | 0.5 | 0.5 | 0.5 | 0.5 | 0.5 | 0.5 | 0.5 |
| ANGLE θw OF WIDTH-DIRECTION SIPE WITH RESPECT TO ANGLE θ OF CENTER LUG GROOVE | θw = θ | θw = θ | θw = θ | θw = θ | θw = θ | θw = θ | θw = θ | θw = θ | θw = θ |
| RATIO (K/Hb) OF DISTANCE K BETWEEN WIDTH-DIRECTION SIPE AND CENTER LUG GROOVE TO WIDTH Hb OF CENTER LUG GROOVE | 1.0 | 1.0 | 1.0 | 1.0 | 1.0 | 1.0 | 1.0 | 1.0 | 1.0 |
| DISTANCE K BETWEEN WIDTH-DIRECTION SIPE AND CENTER LUG GROOVE | 7 mm | 7 mm | 7 mm | 7 mm | 7 mm | 7 mm | 7 mm | 7 mm | 7 mm |
| ANGLE θc OF WIDTH-DIRECTION SIPE WITH RESPECT TO CIRCUMFERENTIAL SIPE | 50° | 55° | 135° | 140° | 90° | 90° | 90° | 90° | 90° |
| RATIO (D/Wb) OF DISTANCE D OF CIRCUMFERENTIAL SIPE FROM CIRCUMFERENTIAL GROOVE TO WIDTH Wb OF CENTER LAND PORTION | 0.9 | 0.9 | 0.9 | 0.9 | 0.9 | 0.8 | 0.2 | 0.1 | 0.5 |
| PERFORMANCE ON ICE AND SNOW | 106 | 107 | 107 | 105 | 107 | 108 | 108 | 107 | 109 |

FIG. 8B

TIRE

TECHNICAL FIELD

The present technology relates to a tire.

BACKGROUND ART

Some known tires form cuts in a tread portion, or so-called sipes to improve performance on ice and snow, which is running performance on snowy roads and icy road surfaces. For example, tires described in Japan Patent Nos. 4466765 B, 4149041 B and 4577455 B and in Japan Unexamined Patent Publication Nos. 2010-247711 A and 2016-159665 A dispose sipes and lug grooves in combination to improve running performance on snow, uneven wear resistance, and wet performance.

Here, lug grooves play an important role in performance on ice and snow of a tire. In other words, during traveling on snow-covered road surfaces, driving force and braking force from the tire are transmitted to the road surface by using not only friction force between the road contact surface of the tire and the road surface but also shear force due to the force acting on, from the land portion, snow on the road surface that has entered the lug grooves, or so-called snow column shear force. As described above, the snow that has entered the lug grooves is discharged from the lug grooves by rotation of the tire when the road contact surface around the lug grooves separates from the road surface, and snow on the road surface newly enters the lug grooves when the tire is further rotated and the road contact surface around the lug grooves comes into contact with the road surface. Such steps are repeated, causing the tire during traveling on snow-covered road surfaces to exert performance on ice and snow.

In a case where the rigidity of the land portions defined by the lug grooves is high, unfortunately, the snow that has entered the lug grooves may be difficult to be discharged from the lug grooves. For example, many tires used under high load, such as all-season tires with severe snow marking for light trucks set the rigidity of the land portion to be relatively high, snow in the lug grooves is easily compacted by the land portion with the high rigidity when the snow enters the lug grooves. In this case, the snow is easily buried in the lug grooves, it is difficult to for the snow to be discharged from the lug grooves, and thus it may be difficult for the tire to ensure performance on ice and snow. This results in room for improvement in performance on snow and ice of a tire to be used at a relatively high load.

SUMMARY

The present technology provides a tire that can provide improved performance on ice and snow.

A tire according to an embodiment of the present technology includes a plurality of circumferential grooves extending in a tire circumferential direction, a plurality of land portions defined by the circumferential grooves, and a plurality of lug grooves extending in a tire width direction. Of the plurality of circumferential grooves, the circumferential groove located on the outermost side in the tire width direction is an outermost circumferential groove, of the plurality of land portions, the land portion located on an inner side of the outermost circumferential groove in the tire width direction is a center land portion, of the plurality of lug grooves, the lug grooves located on an inner side of the outer circumferential groove in the tire width direction are center lug grooves, the center lug grooves opens to the circumferential groove at least at one end, a width-direction sipe extending in the tire width direction and a circumferential sipe extending in the tire circumferential direction are disposed on an individual side of both sides in the tire circumferential direction of the center lug grooves of an individual pair of the center lug grooves adjacent in the tire circumferential direction, the width-direction sipe opens to, at one end, the circumferential groove to which the center lug groove opens and terminates at the other end within the center land portion, the circumferential sipe opens to the center lug groove at one end and terminates at the other end near the width-direction sipe or communicates with the width-direction sipe.

Further, in the tire described above, a relationship between a length Lw of the width-direction sipe in the tire width direction and a width Wb of the center land portion in the tire width direction preferably satisfies $0.3 \leq (Lw/Wb)$.

Furthermore, in the tire described above, an angle θw of the width-direction sipe with respect to the tire circumferential direction with respect to an angle θ of the center lug groove with respect to the tire circumferential direction is preferably in a range $(\theta - 10°) \leq \theta w \leq (\theta + 10°)$.

Additionally, in the tire described above, in a case where a distance in the tire circumferential direction between an opening portion of the width-direction sipe with respect to the circumferential groove and an opening portion of the center lug groove with respect to the circumferential groove to which the width-direction sipe opens is K and a with Hb of the center lug groove in the tire circumferential direction is Hb, the width-direction sipe preferably satisfies $(K/Hb) \geq 1$ and $K \leq 10$ mm.

Moreover, in the tire described above, in a case where a pitch in the tire circumferential direction between the pair of center lug grooves adjacent in the tire circumferential direction is P, the width-direction sipe preferably satisfies $(K/P) \leq 0.3$.

Further, in the tire described above, the circumferential sipe preferably has an angle θc with respect to the width-direction sipe including an end portion terminating near the width-direction sipe or communicating with the circumferential sipe within a range $55° \leq \theta c \leq 135°$.

Furthermore, in the tire described above, a distance D in the tire width direction to the circumferential sipe from the circumferential groove to which the width-direction sipe opens with respect to a width Wb of the center land portion in the tire width direction is preferably in a range $0.2 \leq (D/Wb) \leq 0.8$.

Additionally, in the tire described above, an end portion of the center lug groove, which is located on an opposite side of an end portion opening to the circumferential groove preferably terminates within the center land portion.

Moreover, in the pneumatic tire described above, a length Lw of the width-direction sipe in the tire width direction with respect to a length L of the center lug groove in the tire width direction is preferably in a range $0.5 \leq (Lw/L) \leq 0.9$.

Further, in the tire described above, a distance D in the tire width direction to the circumferential sipe from the circumferential groove to which the width-direction sipe opens with respect to a length L of the center lug groove in the tire width direction is preferably in a range of $0.5 \leq (D/L) \leq 0.9$.

Furthermore, in the tire described above, the width-direction sipe preferably opens to the circumferential groove that defines an outer side in the tire width direction of the center land portion in which the width-direction sipe is disposed.

The tire according to an embodiment of the present technology exerts the effect that can provide improved performance on ice and snow.

BRIEF DESCRIPTION OF DRAWINGS

FIG. 8A is a table showing results of performance evaluation tests of pneumatic tires.

FIG. 8B is a table showing results of performance evaluation tests of pneumatic tires.

DETAILED DESCRIPTION

Tires according to embodiments of the present technology will be described in detail below with reference to the drawings. However, the present technology is not limited to the embodiment. Constituents of the following embodiments include elements that can be substituted and easily conceived of by a person skilled in the art or that are essentially identical.

Embodiments

In the following description, a description will be given using a pneumatic tire 1 as an example of the tire according to the embodiments of the present technology. The pneumatic tire 1 as an example of the tire can be inflated with any gas including air and inert gas, such as nitrogen.

Hereinafter, the term "tire radial direction" refers to a direction orthogonal to a tire rotation axis (not illustrated) that is a rotation axis of the pneumatic tire 1, the term "inner side in a tire radial direction" refers to a side toward the tire rotation axis in the tire radial direction, and the term "outer side in the tire radial direction" refers to a side away from the tire rotation axis in the tire radial direction. The term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equator line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. "Tire equator line" refers to a line in the tire circumferential direction of the pneumatic tire 1 that lies on the tire equatorial plane CL. In the description below, "tire meridian section" refers to a cross-section of the tire taken along a plane that includes the tire rotation axis.

Figure 1:
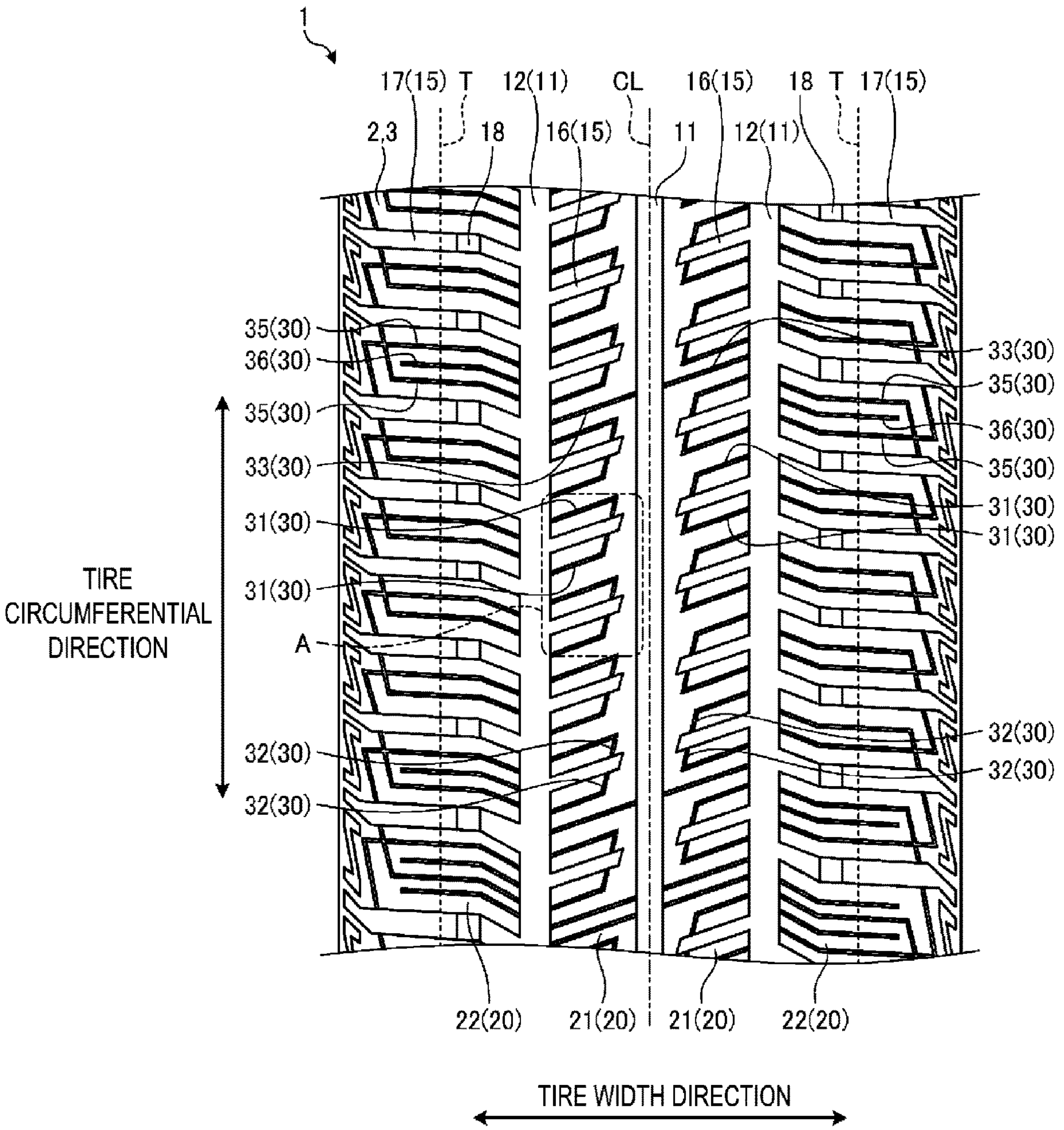
FIG. 1 is a plan view illustrating a road contact surface of a tread portion of a pneumatic tire according to an embodiment.

FIG. 1 is a plan view of a road contact surface 3 of a tread portion 2 of the pneumatic tire 1 according to an embodiment. The pneumatic tire 1 illustrated in FIG. 1 includes the tread portion 2 disposed at the outermost portion of the pneumatic tire 1 in the tire radial direction. The surface of the tread portion 2, in other words, a portion that comes into contact with a road surface when a vehicle (not illustrated) equipped with the pneumatic tire 1 travels is formed as the road contact surface 3. The road contact surface 3 includes a plurality of grooves formed on each of both sides in the tire width direction centered on the tire equatorial plane CL, and the plurality of grooves defines a plurality of land portions 20. The grooves include a plurality of circumferential grooves 11 extending in the tire circumferential direction and a plurality of lug grooves 15 extending in the tire width direction. The land portions 20 defined by the plurality of grooves are defined by the plurality of circumferential grooves 11 and the plurality of lug grooves 15.

In the present embodiment, three circumferential grooves 11 are disposed side by side in the tire width direction. Of the three circumferential grooves 11, one is disposed on the tire equatorial plane CL, and the remaining two are each disposed on either side of the tire equatorial plane CL in the tire width direction. Of the plurality of circumferential grooves 11, a circumferential groove 11 located on the outermost side in the tire width direction is provided on each of both sides of the tire equatorial plane CL in the tire width direction as an outermost circumferential groove 12. The circumferential groove 11 disposed as just described has a groove width within a range of 8.0 mm or more and 20.0 mm or less and a groove depth within a range of 7.0 mm or more and 15.0 mm or less.

Additionally, of the plurality of land portions 20, the land portion 20 disposed on an inner side of the outermost circumferential groove 12 in the tire width direction is a center land portion 21, and the land portion 20 disposed on an outer side of the outermost circumferential groove 12 in the tire width direction is a shoulder land portion 22. In the present embodiment, one circumferential groove 11 is disposed between the two outermost circumferential grooves 12 located on both sides of the tire equatorial plane CL in the tire width direction, and thus two columns of the center land portions 21 each located on the inner side of the outermost circumferential groove 12 in the tire width direction are disposed on both sides of the circumferential groove 11 in the tire width direction located on the tire equatorial plane CL. In other words, the two columns of the center land portions 21 each located on the inner side of the outermost circumferential groove 12 in the tire width direction both include the inner side in the tire width direction defined by the circumferential groove 11 located at the tire equatorial plane CL and the outer side in the tire width direction defined by the outermost circumferential groove 12. Additionally, two columns of the shoulder land portions 22 disposed on the outer side of the respective two outermost circumferential grooves 12 in the tire width direction both include the inner side in the tire width direction defined by the outermost circumferential groove 12.

The lug grooves 15 have a groove width within a range of 5.0 mm or more and 15.0 mm or less and a groove depth within a range of 7.0 mm or more and 15.0 mm or less. The lug grooves 15 are disposed on an inner side in the tire width direction and an outer side of the outermost circumferential groove 12 in the tire width direction, and of the plurality of lug grooves 15, the lug grooves 15 located on the inner side of the outermost circumferential groove 12 in the tire width direction are center lug grooves 16. A plurality of the center lug grooves 16 is disposed side by side in the tire circumferential direction in each of the two columns of the center land portions 21, and each of the center lug grooves 16 includes at least one end opening to the circumferential groove 11. Specifically, each of the center lug grooves 16 disposed in the center land portion 21 opens to the outermost circumferential groove 12 at an outer end portion in the tire width direction and terminates at an inner end portion in the tire width direction within the center land portion 21. The center lug grooves 16 terminate at one end within the center land portion 21 in this manner, and thus the center land portion 21 is formed continuously in the tire circumferential direction. Accordingly, the center land portion 21 is formed as a so-called rib-shaped land portion 20.

Additionally, of the plurality of lug grooves 15, the lug grooves 15 located on the outer side of the outermost circumferential groove 12 in the tire width direction are shoulder lug grooves 17. A plurality of the shoulder lug grooves 17 is disposed side by side in the tire circumferential direction in each of the two columns of the shoulder land portions 22, and each of the shoulder lug grooves 17 opens to the outermost circumferential groove 12 at an inner end portion in the tire width direction. Further, the shoulder lug groove 17 is formed across a ground contact edge T in the tire width direction. Accordingly, the shoulder lug groove 17 is disposed from the position of the outermost circumferential groove 12 located on an inner side of the ground contact edge T in the tire width direction to an outer side of the ground contact edge T in the tire width direction. Furthermore, a raised bottom portion 18 is formed in a groove bottom of the shoulder lug groove 17 at a position further on an inner side in the tire width direction than the ground contact edge T.

Note that the ground contact edges T here refer to both outermost edges in the tire width direction of regions that come into contact with a flat plate on the road contact surface 3 when the pneumatic tire 1 is mounted on a regular rim, inflated to a regular internal pressure, placed perpendicular to the flat plate in a stationary state, and loaded with a load corresponding to a specified load, and the ground contact edges T are continuous in the tire circumferential direction. Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, a regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

The road contact surface 3 also includes a plurality of sipes 30, and the sipes 30 are disposed in each of the land portions 20 including the center land portions 21 and the shoulder land portions 22. The sipes 30 described herein are each formed in a narrow groove shape on the road contact surface 3. When the pneumatic tire 1 is mounted on a regular rim, inflated to a regular internal pressure, and placed in an unloaded state under internal pressure conditions of a regular internal pressure, wall surfaces constituting the narrow groove do not contact one another. Meanwhile, in a case where the narrow groove is located in a portion of the road contact surface formed on a flat plate when a load is vertically applied on the flat plate, or in a case where the land portion 20 in which the narrow grooves flexes, the wall surfaces constituting the narrow groove or at least part of portions disposed on the wall surfaces come into contact with each other due to deformation of the land portion 20. In the present embodiment, the sipe 30 has a sipe width of below 1 mm, which is an interval between the wall surfaces constituting the narrow groove, and a sipe depth within a range of 4.0 mm or more and 12.0 mm or less.

In the center land portion 21, width-direction sipes 31, circumferential sipes 32, and through sipes 33 are disposed as the sipes 30. Of the sipes, the width-direction sipe 31 is the sipe 30 extending in the tire width direction, and the circumferential sipe 32 is the sipe 30 extending in the tire circumferential direction. Also, the through sipe 33 is formed spanning between the circumferential groove 11 that defines the inner side of the center land portion 21 in the tire width direction and the outermost circumferential groove 12 that defines the outer side of the center land portion 21 in the tire width direction.

Of the sipes, the through sipe 33 is disposed only in a portion where a pitch between the center lug grooves 16 adjacent in the tire circumferential direction is relatively large. In addition, the number of through sipes 33 disposed between the center lug grooves 16 differs depending on the size of the pitch between the center lug grooves 16 adjacent in the tire circumferential direction. In other words, the center lug groove 16 has a plurality of pitches having different sizes in one circle in the tire circumferential direction, as an interval between the center lug grooves 16 adjacent in the tire circumferential direction, that is, a pitch in the tire circumferential direction. Accordingly, the center lug grooves 16 adjacent in the tire circumferential direction have pitches that are not all equal in one circle in the tire circumferential direction, and include portions disposed at different pitches. Of portions between the center lug grooves 16 disposed adjacent in the tire circumferential direction at such different pitches, one or a plurality of the through sipes 33 is disposed in a portion where the pitch is relatively large.

Additionally, cross sipes 35 and terminating sipes 36 are disposed in the shoulder land portion 22 as the sipes 30. Of the sipes, two cross sipes 35 are disposed between the shoulder lug grooves 17 adjacent in the tire circumferential direction. The two cross sipes 35 disposed between the shoulder lug grooves 17 adjacent in the tire circumferential direction both open to the outermost circumferential groove 12 at an inner end portion in the tire width direction and extending from the position of the outermost circumferential groove 12 toward an outer side in the tire width direction. Further, the two cross sipes 35 are bent in the tire circumferential direction at a position on the outer side of the ground contact edge T in the tire width direction, and one of the cross sipes 35 extends in the tire circumferential direction toward the side where the other of the cross sipes 35 is located.

The bending positions of the two cross sipes 35 are different from each other in the tire width direction. One cross sipe 35 having the bending position further on an inner side than the bending position of the other cross sipe 35 in the tire width direction bends and then extends in the tire circumferential direction, and thus intersects with the other cross sipe 35. Furthermore, the other cross sipes 35 bends further on an outer side in the tire width direction than the intersecting position with one cross sipes 35 and then extends in the tire circumferential direction. Any portions of the two cross sipes 35 extending in the tire circumferential direction on the outer side of the ground contact edge T in the tire width direction open to portions of the shoulder lug groove 17 located on the outer side of the ground contact edge T in the tire width direction.

Also, the terminating sipes 36 disposed in the shoulder land portion 22 are each formed extending in the tire width direction, and an inner end portion of the terminating sipe 36 in the tire width direction opens to the outermost circumferential groove 12. Further, the terminating sipe 36 extends in the tire width direction and thus is formed across the ground contact edge T in the tire width direction, and an end portion of the terminating sipe 36, which is located on the opposite side of an end portion opening to the outermost circumferential groove 12 terminates within the shoulder land portion 22.

In addition, similar to the through sipes 33 disposed in the center land portion 21, the terminating sipes 36 are disposed only in a portion where a pitch between the shoulder lug grooves 17 adjacent in the tire circumferential direction is relatively large, and the number of terminating sipes 36 differs depending on the size of the pitch between the adjacent shoulder lug grooves 17. In other words, similar to the center lug grooves 16, the shoulder lug grooves 17 adjacent in the tire circumferential direction are disposed at pitches having a plurality of pitches having different sizes. Of portions between the shoulder lug grooves 17 disposed adjacent in the tire circumferential direction at such different pitches, one or a plurality of the terminating sipes 36 is disposed in a portion where the pitch is relatively large.

Figure 2:
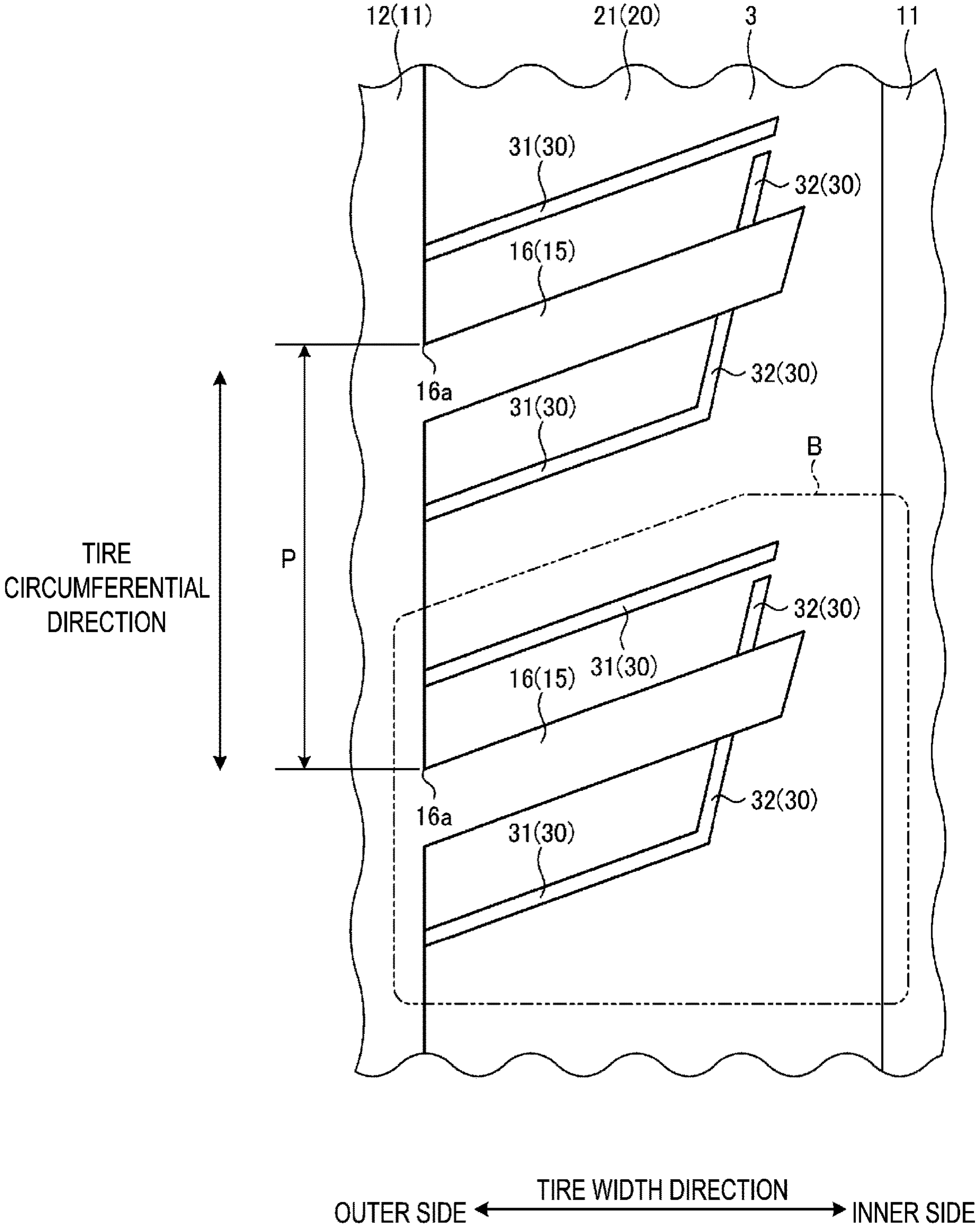
FIG. 2 is a detailed view of portion A of FIG. 1.

FIG. 2 is a detailed view of portion A of FIG. 1. For the width-direction sipes 31 and the circumferential sipes 32 that are disposed in the center land portion 21, the width-direction sipe 31 and the circumferential sipe 32 are disposed on each of both sides in the tire circumferential direction of a center lug groove 16 of an individual pair of the center lug grooves 16 adjacent in the tire circumferential direction. In other words, for the width-direction sipe 31 and the circumferential sipe 32, the respective sipes 30 are disposed on both sides in the tire circumferential direction of the center lug groove 16 of at least part of the individual pair of center lug grooves 16 adjacent in the tire circumferential direction of the plurality of center lug grooves 16 disposed side by side in the tire circumferential direction.

In other words, near one center lug groove 16 of the pair of center lug grooves 16 adjacent in the tire circumferential direction, the width-direction sipe 31 and the circumferential sipe 32 are disposed on each of both sides of the center lug groove 16 in the tire circumferential direction. Similarly, near the other center lug groove 16 of the pair of center lug grooves 16 adjacent in the tire circumferential direction, the width-direction sipe 31 and the circumferential sipe 32 are disposed on each of both sides of the center lug groove 16 in the tire circumferential direction. In the present embodiment, of the center lug grooves 16 disposed side by side in the tire circumferential direction, the width-direction sipe 31 and the circumferential sipe 32 are disposed on each of both sides of all of the center lug grooves 16 in the tire circumferential direction. The width-direction sipe 31 and the circumferential sipe 32 have a sipe depth with respect to the groove depth of the center lug groove 16 within a range of 50% or more and 80% or less.

Figure 3:
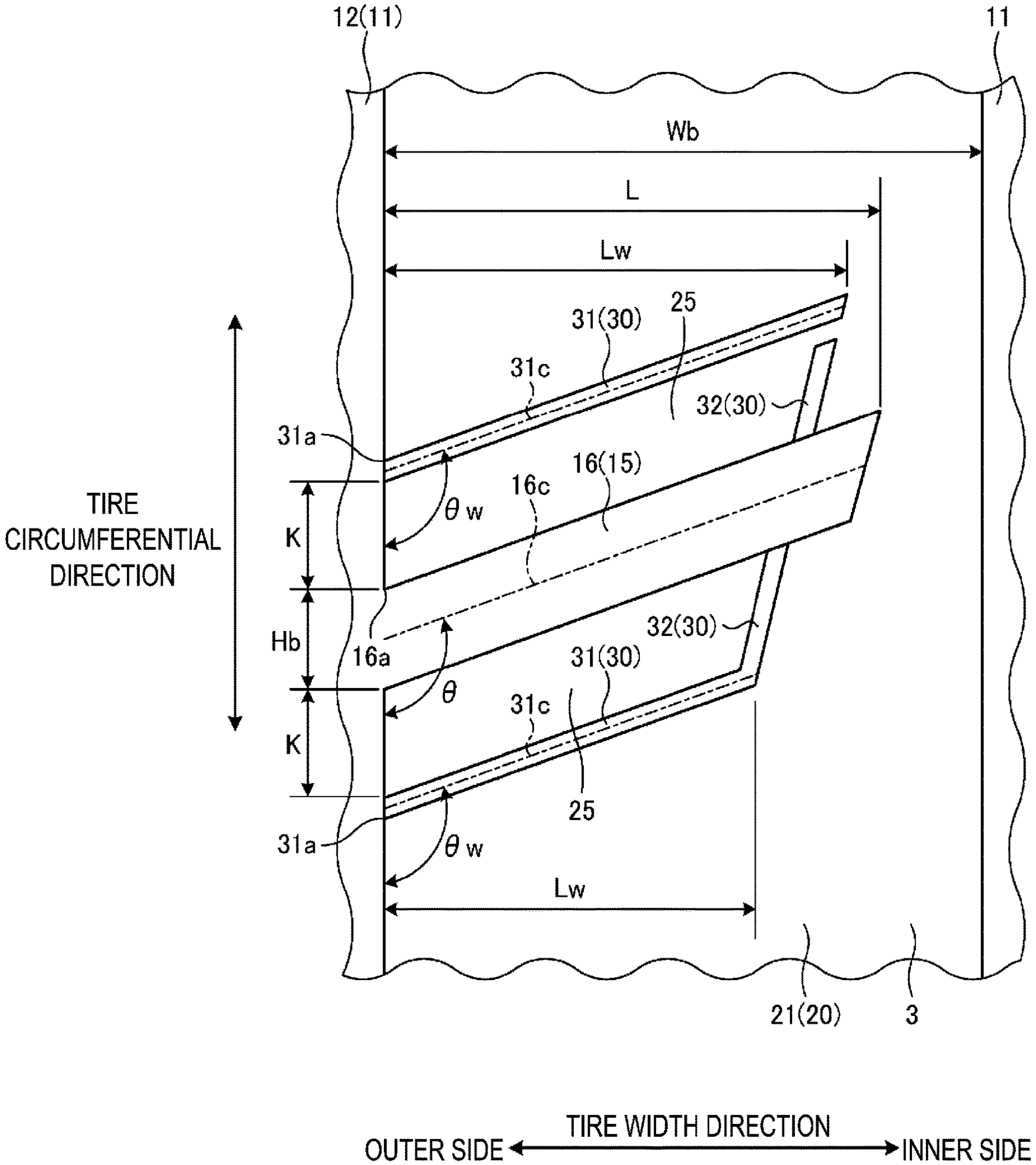
FIG. 3 is a detailed view of portion B of FIG. 2 and is an explanatory diagram of width-direction sipes.

FIG. 3 is a detailed view of portion B of FIG. 2 and is an explanatory diagram of the width-direction sipe 31. Of the width-direction sipe 31 and the circumferential sipe 32 disposed on each of both sides of the center lug groove 16 in the tire circumferential direction, the width-direction sipe 31 is near the center lug groove 16, formed extending in the tire width direction, and separated from the center lug groove 16 at a predetermined interval. The width-direction sipe 31 extending in the tire width direction opens to, at one end, the circumferential groove 11 to which the center lug groove 16 opens and terminates at the other end within the center land portion 21.

In the present embodiment, since the center lug groove 16 opens to the outermost circumferential groove 12, the width-direction sipe 31 also opens to the outermost circumferential groove 12. In other words, the width-direction sipe 31 opens to the circumferential groove 11 defining the outer side in the tire width direction of the center land portion 21 in which the width-direction sipe 31 is disposed. Similar to the center lug groove 16, the width-direction sipe 31 extending in the tire width direction opens at an outer end portion in the tire width direction to the outermost circumferential groove 12 and terminates at an inner end portion in the tire width direction within the center land portion 21.

The width-direction sipe 31 formed in this manner is formed substantially parallel to the center lug groove 16. In other words, an inclination angle θw of the width-direction sipe 31 with respect to the tire circumferential direction is substantially equal to an inclination angle θ of the center lug groove 16 with respect to the tire circumferential direction. Specifically, the angle θw of the width-direction sipe 31 with respect to the tire circumferential direction with respect to the angle θ of the center lug groove 16 with respect to the tire circumferential direction is in the range $(\theta-10°) \leq \theta w \leq (\theta+10°)$. Note that the angle θw of the width-direction sipe 31 with respect to the tire circumferential direction may differ between the width-direction sipes 31 disposed on both sides of the center lug groove 16 in the tire circumferential direction.

In this case, is the angle θw with respect to the tire circumferential direction of the width-direction sipe 31 preferably uses the angle θw of a center line 31*c* in the groove width direction of the width-direction sipe 31 with respect to the tire circumferential direction. Also, the angle θ of the center lug groove 16 with respect to the tire circumferential direction preferably uses the angle θ of a center line 16*c* in the groove width direction of the center lug groove 16 with respect to the tire circumferential direction. Additionally, in the present embodiment, since the outermost circumferential groove 12 extends along the tire circumferential direction, in FIG. 3, the angle θw of the width-direction sipe 31 with respect to the tire circumferential direction and the angle θ of the center lug groove 16 with respect to the tire circumferential direction are illustrated by a relative angle to the edge of the outermost circumferential groove 12; however, the angle θw of the width-direction sipe 31 with respect to the tire circumferential direction and the angle θ of the center lug groove 16 with respect to the tire circumferential direction are not limited to the relative angle to the edge of the outermost circumferential groove 12.

Further, the width-direction sipe 31 has a distance K in the tire circumferential direction between an opening portion 31*a* of the width-direction sipe 31 with respect to the circumferential groove 11 and an opening portion 16*a* of the center lug groove 16 with respect to the circumferential groove 11 to which the width-direction sipe 31 opens satisfying K≤10 mm. In other words, the width-direction sipe 31 and the center lug groove 16 that open to the same circumferential groove 11 have the distance K in the tire circumferential direction between the opening portion 31*a* of the width-direction sipe 31 and the opening portion 16*a* of the center lug groove 16 of 10 mm or less.

Note that the distance K in the tire circumferential direction between the opening portion 31*a* of the width-direction sipe 31 and the opening portion 16*a* of the center lug groove 16 may differ between the width-direction sipes 31 disposed on both sides of the center lug groove 16 in the tire circumferential direction. Furthermore, the distance K in the tire circumferential direction between the opening portion 31*a* of the width-direction sipe 31 and the opening portion 16*a* of the center lug groove 16 is preferably 5 mm or more. In other words, the distance K in the tire circumferential direction between the opening portion 31*a* of the width-direction sipe 31 and the opening portion 16*a* of the center lug groove 16 is preferably within the range 5 mm≤K≤10 mm.

Additionally, the distance K in the tire circumferential direction between the opening portion 31*a* of the width-direction sipe 31 and the opening portion 16*a* of the center lug groove 16 with respect to a width Hb of the center lug groove 16 in the tire circumferential direction satisfies (K/Hb)≥1. In this case, the width Hb of the center lug groove 16 in the tire circumferential direction is the width in the tire circumferential direction in the position of the opening portion 16*a* of the center lug groove 16. In the present embodiment, the width Hb of the center lug groove 16 in the tire circumferential direction is within a range of 5.0 mm or more and 15.0 mm or less.

Furthermore, the width-direction sipe 31 has the distance K in the tire circumferential direction between the opening portion 31*a* of the width-direction sipe 31 and the opening portion 16*a* of the center lug groove 16 with respect to a pitch P in the tire circumferential direction (see FIG. 2) between the pair of center lug grooves 16 adjacent in the tire circumferential direction satisfying (K/P)≤0.3. Note that in this case, the pitch P in the tire circumferential direction between the pair of center lug grooves 16 adjacent in the tire circumferential direction is preferably the pitch P between the center lug grooves 16 located on both sides of the width-direction sipes 31 in the tire circumferential direction. Additionally, the relationship between the distance K in the tire circumferential direction between the opening portion 31*a* of the width-direction sipe 31 and the opening portion 16*a* of the center lug groove 16, and the pitch P in the tire circumferential direction between the pair of center lug grooves 16 adjacent in the tire circumferential direction is preferably in the range 0.15≤(K/P)≤0.3.

Additionally, any of the width-direction sipes 31 located on both sides of the center lug groove 16 in the tire width direction have a relationship between a length Lw of the width-direction sipe 31 in the tire width direction and a width Wb of the center land portion 21 in the tire width direction satisfying 0.3≤(Lw/Wb). Note that the length Lw in the tire width direction of the width-direction sipe 31 may differ between the width-direction sipes 31 disposed on both sides of the center lug groove 16 in the tire circumferential direction. In the present embodiment, the length Lw of the width-direction sipe 31 in the tire width direction differs between the width-direction sipes 31 disposed on both sides of the center lug groove 16 in the tire circumferential direction. Further, the relationship between the length Lw of the width-direction sipe 31 in the tire width direction and the width Wb of the center land portion 21 in the tire width direction is preferably in the range 0.3≤(Lw/Wb)≤0.8.

Furthermore, the length Lw of the width-direction sipe 31 in the tire width direction with respect to a length L of the center lug groove 16 in the tire width direction is in the range 0.5≤(Lw/L)≤0.9. Additionally, in the present embodiment, the end portion of the center lug groove 16, which is located on the opposite side of the end portion opening to the circumferential groove 11 terminates within the center land portion 21. However, in this case, the length L of the center lug groove 16 in the tire width direction with respect to the width Wb of the center land portion 21 in the tire width direction is preferably in the range 0.4≤(L/Wb)≤0.9.

Figure 4:
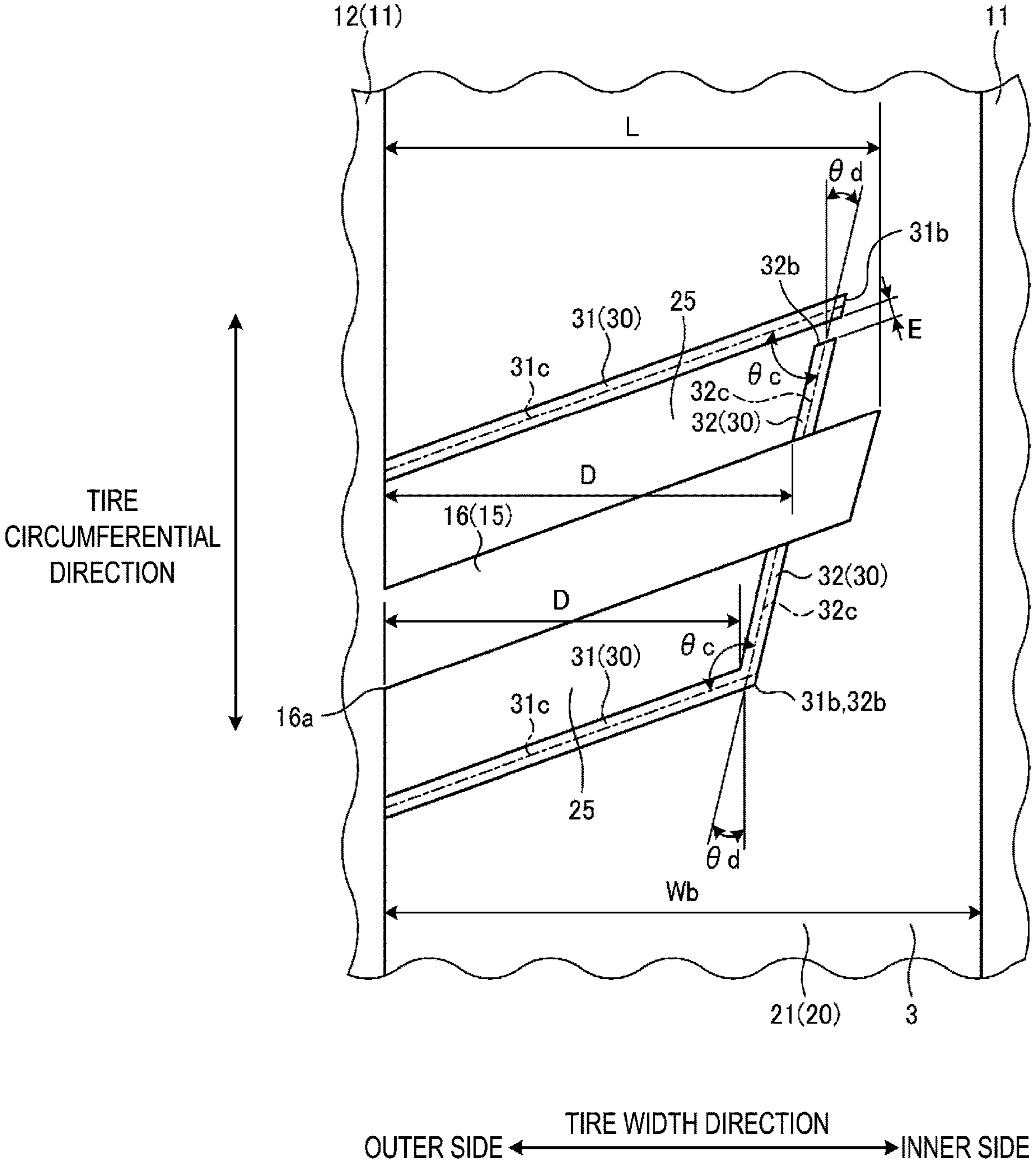
FIG. 4 is a detailed view of portion B of FIG. 2 and is an explanatory diagram of circumferential sipes.

FIG. 4 is a detailed view of portion B of FIG. 2 and is an explanatory diagram of the circumferential sipe 32. Of the width-direction sipe 31 and the circumferential sipe 32 disposed on each of both sides of the center lug groove 16 in the tire circumferential direction, the circumferential sipe 32 extending in the tire circumferential direction is disposed between the center lug groove 16 and the width-direction sipe 31 that are separated in the tire circumferential direction. The circumferential sipe 32 disposed between the center lug groove 16 and the width-direction sipe 31 opens to the center lug groove 16 at one end, and terminates near the width-direction sipe 31 at the other end or communicates with the width-direction sipe 31 at the other end. In other words, of both end portions in the tire circumferential direction of the circumferential sipe 32, an end portion of the circumferential sipe 32, which is located on the center lug groove 16 side opens to the center lug groove 16, and an end portion 32*b* on the opposite side of the end portion located on the center lug groove 16 side terminates near the width-direction sipe 31 or communicates with the width-direction sipe 31.

In the present embodiment, one circumferential sipe 32 of the circumferential sipes 32 located on both sides in the tire circumferential direction of the center lug groove 16 includes the end portion 32*b* separated from the width-direction sipe 31 and terminating near an end portion 31*b* of the width-direction sipe 31, which is located on the side terminating within the center land portion 21. Also, the other circumferential sipe 32 of the circumferential sipes 32 located on both sides in the tire circumferential direction of the center lug groove 16 includes the end portion 32*b* communicating with the width-direction sipe 31. Specifically, the circumferential sipe 32 communicates with the width-direction sipe 31 at the position of the end portion 31*b* of the width-direction sipe 31. Note that a distance E between the end portion 32*b* of the circumferential sipe 32 and the width-direction sipe 31 is preferably 1.5 mm or less.

As just described, the circumferential sipe 32 terminates near the end portion 31*b* of the width-direction sipe 31 or communicates with the end portion 31*b* of the width-direction sipe 31. Accordingly, a set of the width-direction sipe 31 and the circumferential sipe 32 that are located on one side in the tire circumferential direction of the center lug groove 16 is formed in a substantially L shape. Consequently, a portion of the center land portion 21 located on a minor angle side of an L-shaped portion is connected to a portion located on a major angle side of the L-shaped portion only through a narrow portion between the end portion 31*b* of the width-direction sipe 31 and the end portion 32*b* of the circumferential sipe 32, or a portion of the center land portion 21 located on a minor angle side of an L-shaped portion is separated from a portion located on a major angle side of the L -shaped portion by the width-direction sipe 31 and the circumferential sipe 32.

In other words, in the center land portion 21, a portion surrounded by the width-direction sipe 31, the circumferential sipe 32, and the center lug groove 16 is substantially separated by the width-direction sipe 31 and the circumferential sipe 32 from a portion located on an outer side of the area surrounded by the width-direction sipe 31, the circumferential sipe 32, and the center lug groove 16. The portion surrounded by the width-direction sipe 31, the circumferential sipe 32, and the center lug groove 16 in the center land portion 21 is substantially separated from the portion located on the outer side of the area in the center land portion 21 in this manner, and thus the center land portion 21 includes a small block 25 defined by the width-direction sipe 31, the circumferential sipe 32, the center lug groove 16, and the circumferential groove 11. The small block 25 is separated by the width-direction sipe 31 and the circumferential sipe 32 from the portion located on the outer side of the portion surrounded by the width-direction sipe 31, the circumferential sipe 32, and the center lug groove 16 in the center land portion 21, or is connected thereto via a narrow portion between the end portion 32*b* of the circumferential sipe 32 and the width-direction sipe 31 to the portion located on the outer side of the portion surrounded by the width-direction sipe 31, the circumferential sipe 32, and the center lug groove 16 while the major part of the small block 25 is separated.

Additionally, on both sides of the center lug groove 16 in the tire circumferential direction, the width-direction sipe 31 and the circumferential sipe 32 are formed in a substantially L shape, and when the width-direction sipe 31 and the circumferential sipe 32 disposed on both sides in the tire circumferential direction of each of the center lug grooves 16 are viewed as a whole, the width-direction sipes 31 and the circumferential sipes 32 are formed in the form of a substantially U shape with corners having the opening portion 16*a* side of the center lug groove 16 as the opening side. In other words, the small block 25 substantially separated from other portions in the center land portion 21 by the width-direction sipe 31 and the circumferential sipe 32 is disposed on each of both sides of the center lug groove 16 in the tire circumferential direction. The small blocks 25 of the center land portion 21 are disposed on an inner portion having the U shape with corners in the width-direction sipes 31 and the circumferential sipes 32 formed in the form of a substantially U shape with corners on both sides in the tire circumferential direction of the center lug groove 16.

Further, the circumferential sipe 32 disposed between the center lug groove 16 and the width-direction sipe 31 forms an angle θc with respect to the width-direction sipe 31 within the range 55°≤θc≤135°. In other words, the circumferential sipe 32 forms the angle θc with respect to the width-direction sipe 31 within the range 55°≤θc≤135° and is formed extending in the tire circumferential direction between the center lug groove 16 and the width direction sipe 31. In this case, the angle θc of the circumferential sipe 32 with respect to the width-direction sipe 31 is the angle of a portion located on the opening portion 16*a* side of the center lug groove 16, i.e., the angle of a portion located on the small block 25 side, of the angle formed by the width-direction sipe 31 and the circumferential sipe 32. Furthermore, in this case, the angle θc of the circumferential sipe 32 with respect to the width-direction sipe 31 is the relative angle between the center line 31*c* in the groove width direction of the width-direction sipe 31 and a center line 32*c* of the circumferential sipe 32.

As just described, the circumferential sipe 32 with an angle with respect to the width-direction sipe 31 formed at the angle within the predetermined range has two of the circumferential sipes 32 that open to the center lug groove 16 from both sides in the tire circumferential direction of the center lug groove 16 and are substantially parallel to each other. Specifically, the difference between angles θd with respect to the tire circumferential direction of the two circumferential sipes 32 opening to the same center lug groove 16 is preferably within a range of ±10°.

In the present embodiment, of the width-direction sipe 31 and the circumferential sipe 32 disposed on each of both sides of the center lug grooves 16, the width-direction sipe 31 and the circumferential sipe 32 on one side form the angle θc as an acute angle, and the width-direction sipe 31 and the circumferential sipe 32 on the other side form the angle θc as an obtuse angle. Of the circumferential sipes 32 located on both sides in the tire circumferential direction of the center lug groove 16, the circumferential sipe 32 on the side where the angle θc is an acute angle includes the end portion 32*b* separated from the width-direction sipe 31, and the circumferential sipe 32 on the side where the angle θc is an obtuse angle includes the end portion 32*b* communicating with the width-direction sipe 31.

Further, the circumferential sipes 32 located on both sides in the tire circumferential direction of the center lug groove 16 both have a distance D in the tire width direction from the circumferential groove 11 to which the width-direction sipe 31 opens with respect to the width Wb in the tire width direction of the center land portion 21 in the range 0.2≤(D/Wb)≤0.8. Note that the distance D in the tire width direction between the circumferential groove 11 to which the width-direction sipe 31 opens and the circumferential sipe 32 may differ between the circumferential sipes 32 located on both sides in the tire circumferential direction of the center lug groove 16. Furthermore, the distance D in the tire width direction between the circumferential groove 11 to which the width-direction sipe 31 opens and the circumferential sipe 32 with respect to the width Wb in the tire width direction of the center land portion 21 is preferably in the range 0.5≤(D/Wb)≤0.8.

Additionally, the circumferential sipes 32 located on both sides in the tire circumferential direction of the center lug groove 16 both have the distance D from the circumferential groove 11 to which the width-direction sipe 31 opens with respect to the length L in the tire width direction of the center lug groove 16 in the range 0.5≤(D/L)≤0.9. In such cases, the distance D in the tire width direction from the circumferential groove 11 to which the width-direction sipe 31 opens to the circumferential sipe 32 is a distance at a position where the distance in the tire width direction between the circumferential groove 11 and the circumferential sipe 32 is shortest.

Note that even when disposed inclined with respect to the tire circumferential direction in the tire width direction, the circumferential sipe 32 is preferably disposed such that the distance D in the tire width direction from the circumferential groove 11 to which the width-direction sipe 31 opens to every portion of the circumferential sipe 32 with respect to the width Wb in the tire width direction of the center land portion 21 is in the range 0.2≤(D/Wb)≤0.8. Similarly, the circumferential sipe 32 is preferably disposed such that the distance D in the tire width direction from the circumferential groove 11 to which the width-direction sipe 31 opens to every portion of the circumferential sipe 32 with respect to the length L in the tire width direction of the center lug groove 16 is in the range $0.6 \leq (D/L) \leq 0.8$.

The pneumatic tire 1 according to the present embodiment is, for example, a pneumatic tire 1 for a light truck to be mounted thereon. In the event of mounting the pneumatic tire 1 on a vehicle, the pneumatic tire 1 is assembled on a rim wheel and mounted on the vehicle in an inflated state where the inside is filled with air. When the vehicle on which the pneumatic tires 1 are mounted travels, the pneumatic tires 1 each rotate while of the road contact surface 3 on the tread portion 2, the road contact surface 3 located at the bottom comes into contact with the road surface. When traveling on dry road surfaces, the vehicle on which the pneumatic tires 1 are mounted travels by, mainly with friction force between the road contact surface 3 and the road surfaces, transmitting driving force and braking force to the road surfaces and generating turning force. Additionally, during traveling on wet road surfaces, water between the road contact surface 3 and the road surfaces enters grooves such as the circumferential grooves 11 and the lug grooves 15, and the sipes 30, and the vehicle travels while the water between the road contact surface 3 and the road surfaces is drained through the grooves. As a result, the road contact surface 3 is easily brought into contact with the road surfaces, and the vehicle can travel with friction force between the road contact surface 3 and the road surfaces.

Additionally, during traveling on snow-covered road surfaces or icy road surfaces, the vehicle travels with the use of the edge effect of the circumferential grooves 11, the lug grooves 15, and the sipes 30. In other words, during traveling on snow-covered road surfaces or icy road surfaces, the vehicle travels with the use of resistance caused when the edges of circumferential grooves 11, the edges of the lug grooves 15, and the edges of the sipes 30 are caught on the snow surface or the icy surface. Further, during traveling on icy road surfaces, water on the icy road surface is absorbed by the sipes 30 to remove the water film between the icy road surface and the road contact surface 3, and thus the road contact surface 3 easily comes into contact with the icy road surface. As a result, the resistance between the road contact surface 3 and the icy road surface is increased due to the frictional force and the edge effect, and thus running performance of the vehicle on which the pneumatic tires 1 are mounted can be ensured.

Furthermore, during traveling on snow-covered road surfaces, the pneumatic tire 1 presses and compacts snow on the road surfaces with the road contact surface 3, and the snow on the road surfaces entering the lug grooves 15 is being pressed and compacted into the grooves. In such a state, when driving force or braking force acts on the pneumatic tire 1, a so-called snow column shear force, which is a shear force acting on the snow in the grooves is generated between the pneumatic tire 1 and the snow. During traveling on snow-covered road surfaces, resistance is generated between the pneumatic tire 1 and the road surfaces by the snow column shear force, and thus driving force and braking force can be transmitted to the road surfaces, and snow traction properties can be ensured. As a result, the vehicle can ensure running performance on snow-covered road surfaces.

In a case where the vehicle on which the pneumatic tires 1 are mounted travels on snow-covered road surfaces, snow on the road surface enters the lug grooves 15 in this manner; however, the snow that has entered the grooves is discharged from the grooves when portions which the snow has entered separate from the road surface by rotation of the pneumatic tire 1. Meanwhile, when a region of the lug grooves 15 disposed at other locations comes into contact with the road surface by rotation of the pneumatic tire 1, snow on the road surface newly enters the lug grooves 15 at or near the portions coming into contact with the road surface, and thus snow column shear force is generated. Such steps are repeated, and thus the pneumatic tires during traveling on snow-covered road surfaces exert performance on ice and snow.

As described above, the discharge of the snow that has entered the lug grooves 15 during traveling on snow-covered road surfaces is facilitated by deformation of the land portions 20, which are defined by the lug grooves 15, as the pneumatic tire 1 rotates while coming into contact with the road surface. Here, the rigidity of the land portion 20 is increasingly set on the high side on the assumption that the pneumatic tires 1 mounted on a light truck are used under a high load. In a case where the rigidity of the land portion 20 is high, the land portion 20 is not easily deformed. Accordingly, when snow has entered the lug grooves 15 during traveling on snow-covered road surfaces, the discharge of the snow from the lug grooves 15 by deformation of the land portion 20 is not easily attained. As a result, the lug grooves 15 easily get clogged with the snow. In this case, snow is less likely to newly enter the lug grooves 15 clogged with the snow, and thus it is difficult to generate snow column shear force, which makes it difficult to ensure snow traction properties.

In contrast, in the pneumatic tire 1 according to the present embodiment, the width-direction sipe 31 and the circumferential sipe 32 are disposed on both sides of the center lug groove 16 in the tire circumferential direction, and the small block 25 substantially separated from other portions of the center land portion 21 by the width-direction sipes 31 and the circumferential sipes 32 is disposed on each of both sides of the center lug groove 16 in the tire circumferential direction. Accordingly, the rigidity of a portion located near the center lug groove 16 in the center land portion 21 can be decreased by the width-direction sipe 31 and the circumferential sipe 32, and the portion near the center lug groove 16 in the center land portion 21 can be easily deformed. Consequently, even in a case where snow has entered the center lug grooves 16 during traveling on snow-covered road surfaces, a portion located near the center lug groove 16 in the center land portion 21 is easily deformed, and thus the snow in the center lug grooves 16 can be easily discharged.

Further, the width-direction sipe 31 opens at one end to the circumferential groove 11 to which the center lug groove 16 opens, and the rigidity of a region of an intersection between the center lug groove 16 and the circumferential groove 11 in the center land portion 21 can be decreased, allowing the center land portion 21 to be easily deformed in a region of the opening portion **16*a* of the center lug groove 16. As a result, the center land portion 21 can be more easily deformed, and the snow that has entered the center lug grooves 16** can be more reliably and easily discharged.

Furthermore, for the width-direction sipes 31 and the circumferential sipes 32, the width-direction sipe 31 and the circumferential sipe 32 are disposed on both sides in the tire circumferential direction of the center lug groove 16 of the individual pair of center lug grooves 16 adjacent in the tire circumferential direction. Thus, both of the pair of center lug grooves 16 adjacent in the tire circumferential direction can provide enhanced performance for discharging snow.

Accordingly, the center lug grooves 16 that allows snow to easily and newly enter can be disposed continuously in the tire circumferential direction. Consequently, snow column shear force can be continuously generated during traveling on snow-covered road surfaces, and snow traction properties during rotation of the pneumatic tire 1 on the snow-covered road surfaces can be continuously ensured. As a result, performance on ice and snow can be more reliably improved.

Additionally, the width-direction sipe 31 has the relationship between the length Lw in the tire width direction of the width-direction sipe 31 and the width Wb in the tire width direction of the center land portion 21 satisfying $0.3 \leq (Lw/Wb)$, allowing the rigidity of the center land portion 21 to be more reliably and effectively decreased. In other words, when the relationship between the length Lw of the width-direction sipe 31 and the width Wb of the center land portion 21 is $0.3 > (Lw/Wb)$, the length Lw in the tire width direction of the width-direction sipe 31 is too short, even disposing the width-direction sipe 31 near the center lug groove 16 may have difficulty in effectively reducing the rigidity of the center land portion 21.

In contrast, when the relationship between the length Lw of the width-direction sipe 31 and the width Wb of the center land portion 21 satisfies $0.3 \leq (Lw/Wb)$, the length Lw in the tire width direction of the width-direction sipe 31 can be ensured with respect to the width Wb in the tire width direction of the center land portion 21, allowing the rigidity of the center land portion 21 to be effectively decreased by the width-direction sipe 31 disposed near the center lug groove 16. Thus, the center land portion 21 can be more reliably deformed, and the snow that has entered the center lug grooves 16 can be more reliably and easily discharged. Consequently, by continuously generating snow column shear force during traveling on snow-covered road surfaces, snow traction properties can be ensured. As a result, performance on ice and snow can be more reliably improved.

Moreover, the angle θw of the width-direction sipe 31 with respect to the tire circumferential direction with respect to the angle θ of the center lug groove 16 with respect to the tire circumferential direction is in the range $(\theta - 10°) \leq \theta w \leq (\theta + 10°)$, allowing the rigidity of a region of the center lug groove 16 in the center land portion 21 to be more reliably and moderately decreased while the rigidity of the center land portion 21 is prevented from being locally excessively decreased. In other words, in a case where the angle θw of the width-direction sipe 31 with respect to the angle θ of the center lug groove 16 is $\theta w < (\theta - 10°)$ or $\theta w > (\theta + 10°)$, the difference between the angle θ of the center lug groove 16 and the angle θw of the width-direction sipe 31 is too large. Accordingly, a section having a too large distance between the center lug groove 16 and the width-direction sipe 31 may be generated or a section having a too small distance between the center lug groove 16 and the width-direction sipe 31 may be generated. When the distance between the center lug groove 16 and the width-direction sipe 31 is too large, it is difficult to effectively decrease the rigidity of the center land portion 21. Accordingly, it may be difficult to discharge snow that has entered the center lug grooves 16. In a case where the distance between the center lug groove 16 and the width-direction sipe 31 is too small, the rigidity of a portion between the center lug groove 16 and the width-direction sipe 31 in the center land portion 21 is locally excessively decreased. Accordingly, chipping or uneven wear may easily occur at a portion having low rigidity in the center land portion 21.

In contrast, in a case where the angle θw of the width-direction sipe 31 with respect to the angle θ of the center lug groove 16 is in the range $(\theta - 10°) \leq \theta w \leq (\theta + 10°)$, the angle θw of the width-direction sipe 31 can be brought close to the angle θ of the center lug groove 16, and the width-direction sipe 31 can be brought close to parallel to the center lug groove 16. Accordingly, the distance between the center lug groove 16 and the width-direction sipe 31 can be prevented from being too large while the rigidity of the center land portion 21 is prevented from locally excessively decreased due to the too small distance between the center lug groove 16 and the width-direction sipe 31, allowing the rigidity of a region of the center lug groove 16 in the center land portion 21 to be more reliably and moderately decreased. Consequently, the snow that has entered the center lug grooves 16 can be more reliably and easily discharged while the occurrence of chipping or uneven wear of the center land portion 21 is suppressed. As a result, performance on ice and snow can be improved while the durability of the land portion 20 is ensured.

Further, the relationship between the distance K in the tire circumferential direction between the opening portion 31*a* of the width-direction sipe 31 with respect to the circumferential groove 11 and the opening portion 16*a* of the center lug groove 16, and the width Hb in the tire circumferential direction of the center lug groove 16 satisfies $(K/Hb) \geq 1$ and satisfies $K \leq 10$ mm. Accordingly, the rigidity of a portion between the width-direction sipe 31 and the center lug groove 16 in the center land portion 21 is prevented from being excessively decreased and in the meantime, the rigidity of the portion can be more reliably and moderately decreased. In other words, in a case where the relationship between the distance K between the opening portion 31*a* of the width-direction sipe 31 and the opening portion 16*a* of the center lug groove 16, and the width Hb of the center lug groove 16 is $(K/Hb) < 1$, the distance K between the opening portion 31*a* of the width-direction sipe 31 and the opening portion 16*a* of the center lug groove 16 is too small. Accordingly, the rigidity of a portion between the width-direction sipe 31 and the center lug groove 16 in the center land portion 21 may be excessively decreased. In this case, chipping or uneven wear may easily occur at a portion having low rigidity in the center land portion 21. Furthermore, in a case where the distance K between the opening portion 31*a* of the width-direction sipe 31 and the opening portion 16*a* of the center lug groove 16 is $K > 10$ mm, the distance K between the opening portion 31*a* of the width-direction sipe 31 and the opening portion 16*a* of the center lug groove 16 is too large, and thus it may be difficult to effectively decrease the rigidity of the center land portion 21. In this case, it may be difficult to discharge the snow that has entered the center lug grooves 16.

In contrast, in a case where the relationship between the distance K between the opening portion 31*a* of the width-direction sipe 31 and the opening portion 16*a* of the center lug groove 16, and the width Hb of the center lug groove 16 satisfies $(K/Hb) \geq 1$ and satisfies $K \leq 10$ mm, the rigidity of a region of the center lug groove 16 in the center land portion 21 can be more reliably and moderately decreased while the rigidity of a portion between the width-direction sipe 31 and the center lug groove 16 in the center land portion 21 is prevented from being excessively decreased. Consequently, the snow that has entered the center lug grooves 16 can be more reliably and easily discharged while the occurrence of chipping or uneven wear of the center land portion 21 is suppressed. As a result, performance on ice and snow can be improved while the durability of the land portion 20 is ensured.

Additionally, the relationship between the distance K in the tire circumferential direction between the opening portion 31*a* of the width-direction sipe 31 with respect to the circumferential groove 11 and the opening portion 16*a* of the center lug groove 16, and the pitch P in the tire circumferential direction between the pair of center lug grooves 16 adjacent in the tire circumferential direction satisfies (K/P) ≤0.3, and thus the rigidity of the center land portion 21 can be more reliably and effectively decreased. In other words, in a case where the relationship the distance K between the opening portion 31*a* of the width-direction sipe 31 and the opening portion 16*a* of the center lug groove 16, and the pitch Pin the tire circumferential direction between the pair of center lug grooves 16 adjacent in the tire circumferential direction is (K/P)>0.3, the distance K between the opening portion 31*a* of the width-direction sipe 31 and the opening portion 16*a* of the center lug groove 16 may be too large with respect to the pitch P between the center lug grooves 16 adjacent in the tire circumferential direction. In this case, it is difficult to effectively decrease the rigidity of the center land portion 21, and it may be difficult to discharge the snow that has entered the center lug grooves 16.

In contrast, in a case where the relationship the distance K between the opening portion 31*a* of the width-direction sipe 31 and the opening portion 16*a* of the center lug groove 16, and the pitch P in the tire circumferential direction between the pair of center lug grooves 16 adjacent in the tire circumferential direction satisfies (K/P)≤0.3, the rigidity of a portion between the width-direction sipe 31 and the center lug groove 16 in the center land portion 21 can be more reliably decreased. Consequently, the snow that has entered the center lug grooves 16 can be more reliably and easily discharged. As a result, performance on ice and snow can be more reliably improved.

Further, since the angle θc of the circumferential sipe 32 with respect to the width-direction sipe 31 is in the range 55°≤θc≤135°, the rigidity of the small block 25 can be more reliably and moderately decreased while the rigidity of the small block 25 in the center land portion 21 is prevented from being excessively decreased. In other words, in a case where the angle θc of the circumferential sipe 32 with respect to the width-direction sipe 31 is θc<55°, the angle θc of the circumferential sipe 32 with respect to the width-direction sipe 31 is too small. Accordingly, the rigidity of the small block 25 defined by the width-direction sipe 31 and the circumferential sipe 32 in the center land portion 21 may be excessively decreased. In this case, chipping or uneven wear may easily occur in a location at or near the area of intersection between the width-direction sipe 31 and the circumferential sipe 32 in the center land portion 21. Furthermore, in a case where the angle θc of the circumferential sipe 32 with respect to the width-direction sipe 31 is θc>135°, the angle θc of the circumferential sipe 32 with respect to the width-direction sipe 31 is too large, and thus it may be difficult to decrease the rigidity of the small block 25 of the center land portion 21. In this case, it may be difficult to decrease the rigidity of a portion adjacent to the center lug groove 16 in the center land portion 21, and thus it may be difficult to discharge the snow that has entered the center lug grooves 16.

In contrast, in a case where the angle θc of the circumferential sipe 32 with respect to the width-direction sipe 31 is in the range 55°≤θc≤135°, the rigidity of the small block 25 of the center land portion 21 can be more reliably and moderately decreased. Consequently, the snow that has entered the center lug grooves 16 can be more reliably and easily discharged while the occurrence of chipping or uneven wear of the center land portion 21 is suppressed. As a result, performance on ice and snow can be improved while the durability of the land portion 20 is ensured.

Additionally, the distance D in the tire width direction of the circumferential sipe 32 from the circumferential groove 11 to which the width-direction sipe 31 opens with respect to the width Wb in the tire width direction of the center land portion 21 is in the range 0.2≤(D/Wb)≤0.8, allowing the rigidity of the small block 25 to be more reliably and moderately decreased while the rigidity of the small block 25 in the center land portion 21 is prevented from being excessively decreased. In other words, in a case where the distance D between the circumferential groove 11 to which the width-direction sipe 31 opens and the circumferential sipe 32 with respect to the width Wb of the center land portion 21 is (D/Wb)<0.2, the distance D between the circumferential groove 11 and the circumferential sipe 32 is too small, and thus the rigidity of the small block 25 of the center land portion 21 may be excessively decreased. In this case, chipping or uneven wear may easily occur in the small block 25 having low rigidity. Moreover, in a case where the distance D between the circumferential groove 11 to which the width-direction sipe 31 opens and the circumferential sipe 32 with respect to the width Wb of the center land portion 21 is (D/Wb)>0.8, the distance D between the circumferential groove 11 and the circumferential sipe 32 is too large, and thus it may be difficult to decrease the rigidity of the small block 25 of the center land portion 21. In this case, it may be difficult to discharge the snow that has entered the center lug grooves 16.

In contrast, in a case where the distance D between the circumferential groove 11 to which the width-direction sipe 31 opens and the circumferential sipe 32 with respect to the width Wb of the center land portion 21 is in the range 0.2≤(D/Wb)≤0.8, the rigidity of the small block 25 of the center land portion 21 can be more reliably and moderately decreased. Consequently, the snow that has entered the center lug grooves 16 can be more reliably and easily discharged while the occurrence of chipping or uneven wear of the center land portion 21 is suppressed. As a result, performance on ice and snow can be improved while the durability of the land portion 20 is ensured.

Additionally, the end portion of the center lug groove 16, which is located on the opposite side of the end portion opening to the circumferential groove 11 terminates within the center land portion 21. Accordingly, by defining the small block 25 by the width-direction sipe 31 and the circumferential sipe 32 while ensuring the rigidity of the center land portion 21, the rigidity of a portion adjacent to the center lug groove 16 in the center land portion 21 can be decreased. Accordingly, the snow that has entered the center lug grooves 16 can be easily discharged while the occurrence of chipping or uneven wear of the center land portion 21 in use under a high load is more reliably suppressed. As a result, performance on ice and snow can be improved while the durability of the land portion 20 is more reliably ensured.

Further, the length Lw in the tire width direction of the width-direction sipe 31 with respect to the length L in the tire width direction of the center lug groove 16 is in the range 0.5≤(Lw/L)≤0.9, and the rigidity of a portion near the center lug groove 16 in the center land portion 21 can be more reliably and moderately decreased while the rigidity of the portion is prevented from being excessively decreased. In other words, in a case where the length Lw of the width-direction sipe 31 with respect to the length L of the center lug groove 16 is (Lw/L)<0.5, the length Lw in the tire width direction of the width-direction sipe 31 is too short, even disposing the width-direction sipe 31 near the center lug groove 16 may have difficulty in effectively decreasing the rigidity of the center land portion 21. In this case, even disposing the width-direction sipe 31 may have difficulty in discharging the snow that has entered the center lug grooves 16. Furthermore, in a case where the length Lw of the width-direction sipe 31 with respect to the length L of the center lug groove 16 is (Lw/L)>0.9, the length Lw in the tire width direction of the width-direction sipe 31 is too long, and thus the rigidity of a portion near the center lug groove 16 in the center land portion 21 may be excessively decreased. In this case, chipping or uneven wear may easily occur at a portion having low rigidity in the center land portion 21.

In contrast, in a case where the length Lw of the width-direction sipe 31 in the tire width direction with respect to the length L of the center lug groove 16 in the tire width direction is in the range 0.5≤(Lw/L)≤0.9, the rigidity of a portion near the center lug groove 16 can be more reliably and moderately decreased while the rigidity of the portion near the center lug groove 16 in the center land portion 21 is prevented from being excessively decreased. Consequently, the snow that has entered the center lug grooves 16 can be more reliably and easily discharged while the occurrence of chipping or uneven wear of the center land portion 21 is suppressed. As a result, performance on ice and snow can be improved while the durability of the land portion 20 is ensured.

Additionally, the distance D in the tire width direction of the circumferential sipe 32 from the circumferential groove 11 to which the width-direction sipe 31 opens with respect to the length L in the tire width direction of the center lug groove 16 is in the range 0.5≤(D/L)≤0.9, and the rigidity of the small block 25 can be more reliably and moderately decreased while the rigidity of the small block 25 of the center land portion 21 is prevented from being excessively decreased. In other words, in a case where the distance D between the circumferential groove 11 to which the width-direction sipe 31 opens and the circumferential sipe 32 with respect to the length L of the center lug groove 16 is (D/L)<0.5, the distance between the circumferential groove 11 and the circumferential sipe 32 is too small, and thus the rigidity of the small block 25 of the center land portion 21 may be excessively decreased. In this case, chipping or uneven wear may easily occur in the small block 25 having low rigidity. In addition, in a case where the distance D between the circumferential groove 11 to which the width-direction sipe 31 opens and the circumferential sipe 32 with respect to the length L of the center lug groove 16 is (D/L)>0.9, the distance D between the circumferential groove 11 and the circumferential sipe 32 is too large, and thus it may be difficult to decrease the rigidity of the small block 25 of the center land portion 21. In this case, it may be difficult to decrease the rigidity of a portion adjacent to the center lug groove 16 in the center land portion 21, and thus it may be difficult to discharge the snow that has entered the center lug grooves 16.

In contrast, in a case where the distance D between the circumferential groove 11 to which the width-direction sipe 31 opens and the circumferential sipe 32 with respect to the length L of the center lug groove 16 is in the range 0.5≤(D/L)≤0.9, the rigidity of the small block 25 of the center land portion 21 can be more reliably and moderately decreased. Consequently, the snow that has entered the center lug grooves 16 can be more reliably and easily discharged while the occurrence of chipping or uneven wear of the center land portion 21 is suppressed. As a result, performance on ice and snow can be improved while the durability of the land portion 20 is ensured.

Moreover, the width-direction sipe 31 opens to the circumferential groove 11 defining the outer side in the tire width direction of the center land portion 21 in which the width-direction sipe 31 is disposed, and thus the rigidity of a region of an intersection between the circumferential groove 11 defining the outer side of the center land portion 21 in the tire circumferential direction and the center lug groove 16 can be decreased. Accordingly, the center land portion 21 can be easily deformed at a location at or near the opening portion 16*a* on the outer side in the tire width direction of the center lug groove 16, and the snow that has entered the center lug grooves 16 can be easily discharged toward the outer side in the tire width direction at which ground contact pressure is relatively low. Consequently, the snow that has entered the center lug grooves 16 can be more reliably and easily discharged. As a result, performance on ice and snow can be more reliably improved.

Modified Examples

Figure 5:
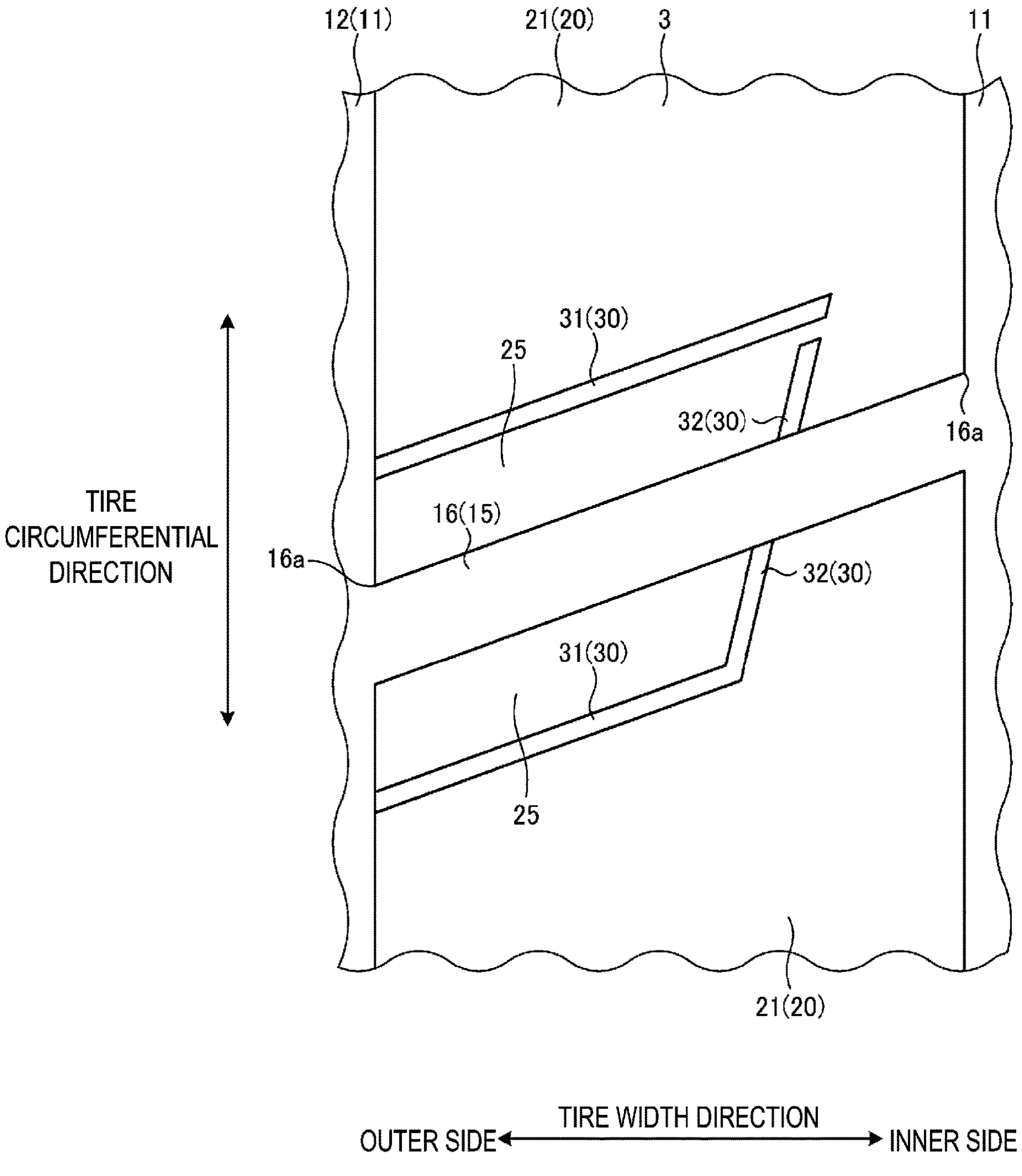
FIG. 5 is an explanatory diagram of a modified example of a pneumatic tire according to an embodiment, illustrating a case where both ends of a center lug groove open to circumferential grooves.

Note that in the embodiment described above, the center lug groove 16 terminates at one end within the center land portion 21. However, the center lug groove 16 does not necessarily terminate at an end portion within the land portion 20. FIG. 5 illustrates a modified example of a pneumatic tire according to an embodiment and is an explanatory diagram of a case where both ends of the center lug groove 16 open to the circumferential grooves 11. As illustrated in FIG. 5, for example, the end portions on both sides of the center lug groove 16 in the tire width direction may each open to the respective circumferential grooves 11. In other words, both ends of the center lug groove 16 open to the two circumferential grooves 11 defining both ends in the tire width direction of the center land portion 21, and both ends may each be formed as the opening portion 16*a* to the circumferential groove 11. In this case, the center land portion 21 includes both end sides in the tire width direction defined by the respective circumferential grooves 11 and both end sides in the tire circumferential direction defined by the lug grooves 15 and is formed as the so-called block-shaped land portion 20.

Even in a case where both ends of the center lug groove 16 open to the circumferential grooves 11 and the center land portion 21 is formed as the block-shaped land portion 20 as just described, the width-direction sipe 31 preferably opens to the circumferential groove 11 at one end and terminates at the other end within the center land portion 21. Accordingly, the small block 25 is defined by the width-direction sipe 31 and the circumferential sipe 32, and thus the rigidity of a vicinity of the center lug groove 16 in the center land portion 21 can be decreased. In addition, the rigidity of the center land portion 21 can be prevented from being excessively decreased due to extending of the width-direction sipe 31 through the center land portion 21 in the tire width direction. Consequently, by ensuring the rigidity of the center land portion 21, the rigidity of the vicinity of the center lug groove 16 in the center land portion 21 is decreased while the occurrence of chipping or uneven wear of the center land portion 21 is suppressed, and thus the snow that has entered the center lug grooves 16 can be more reliably and easily discharged. As a result, performance on ice and snow can be improved while the durability of the land portion 20 is ensured.

Figure 6:
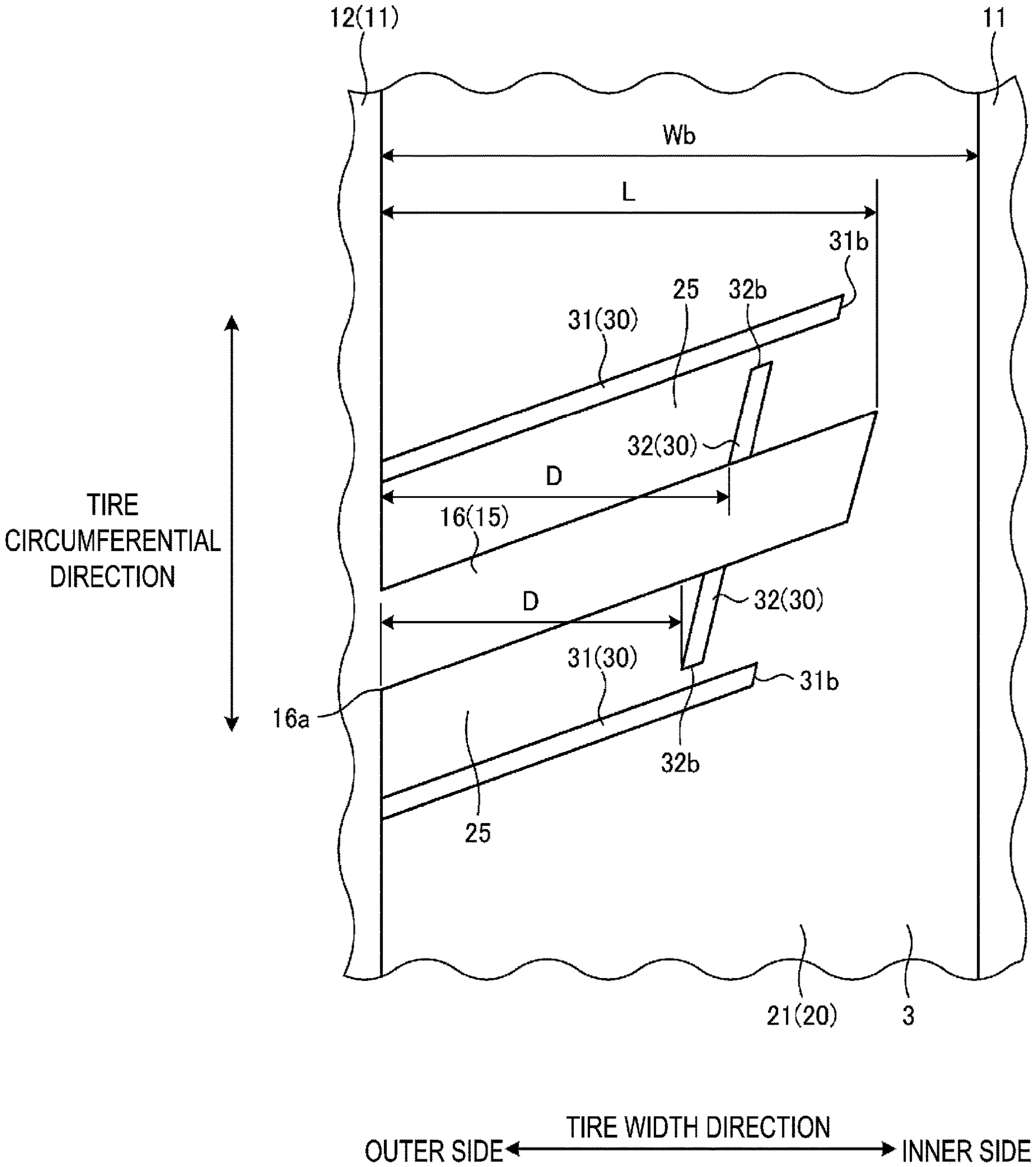
FIG. 6 is an explanatory diagram of a modified example of a pneumatic tire according to an embodiment, illustrating a case where an end portion of a circumferential sipe is separated from an end portion of a width-direction sipe.

Further, in the embodiment described above, the end portion 32*b* of the circumferential sipe 32 is located near the end portion 31*b* of the width-direction sipe 31 or communicates with the end portion 31*b* of the width-direction sipe 31, and the end portion 32*b* of the circumferential sipe 32 may be separated from the end portion 31*b* of the width-direction sipe 31. FIG. 6 is an explanatory diagram of a modified example of the pneumatic tire 1 according to an embodiment, illustrating a case where the end portion 32*b* of the circumferential sipe 32 is separated from the end portion 31*b* of the width-direction sipe 31. As illustrated in FIG. 6, for example, the end portion 32*b* of the circumferential sipe 32 on the opposite side of the end portion opening to the center lug groove 16 may terminate within the center land portion 21, at a location away from the end portion 31*b* of the width-direction sipe 31 and in the vicinity of the width-direction sipe 31. Alternatively, the end portion 32*b* of the circumferential sipe 32, which is located on the opposite side of the end portion opening to the center lug groove 16 may communicate with the width-direction sipe 31, at a location away from the end portion 31*b* of the width-direction sipe 31 (not illustrated). In other words, the width-direction sipe 31 may be formed protruding from the circumferential sipe 32 toward the opposite side of the side in the tire width direction where the circumferential groove 11 to which the width-direction sipe 31 opens is located.

As just described, even in a case where the end portion 32*b* of the circumferential sipe 32 is separated from the end portion 31*b* of the width-direction sipe 31, the end portion 32*b* of the circumferential sipe 32 is located near the width-direction sipe 31 or communicates with the width-direction sipe 31, at a location away from the end portion 31*b* of the width-direction sipe 31. Thus, the small block 25 can be defined by the width-direction sipe 31 and the circumferential sipe 32. As a result, the rigidity of the vicinity of the center lug groove 16 in the center land portion 21 can be decreased, and the snow that has entered center lug grooves 16 can be easily discharged.

Figure 7:
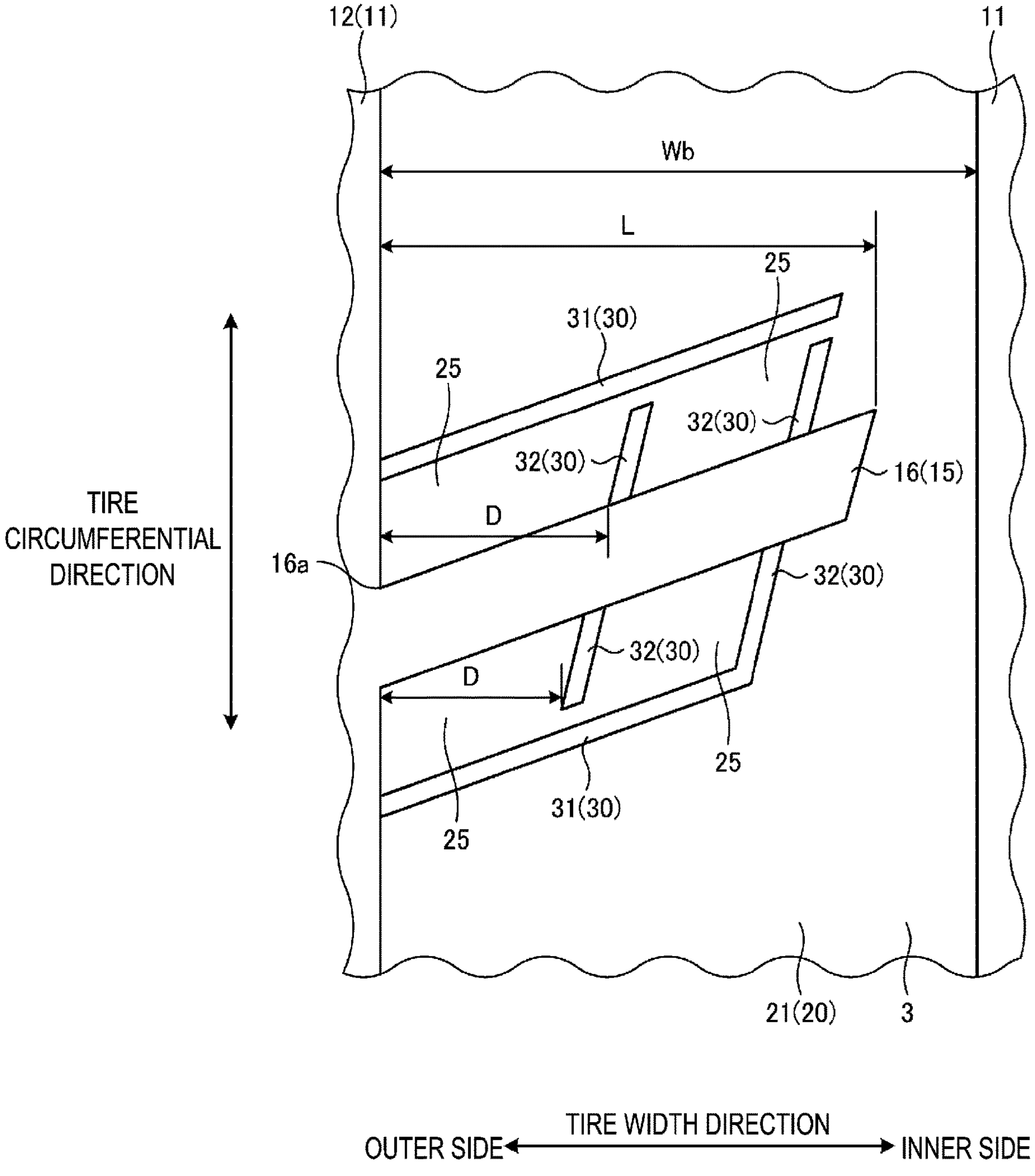
FIG. 7 is an explanatory diagram of a modified example of a pneumatic tire according to an embodiment, illustrating a case where a plurality of circumferential sipes is disposed between a width-direction sipe and a center lug groove.

Furthermore, in the embodiment described above, each one of the circumferential sipes 32 is disposed between the width-direction sipe 31 and the center lug groove 16, but a plurality of the circumferential sipes 32 may be disposed between the width-direction sipe 31 and the center lug groove 16. FIG. 7 is an explanatory diagram of a modified example of the pneumatic tire 1 according to an embodiment, illustrating a case where a plurality of the circumferential sipes 32 is disposed between the width-direction sipe 31 and the center lug groove 16. As illustrated in FIG. 7, for example, the circumferential sipes 32 having one end opening to the center lug groove 16 and extending in the tire circumferential direction may be disposed two by two between the width-direction sipe 31 and the center lug groove 16. Likewise for the small block 25 defined by the width-direction sipe 31 and the circumferential sipe 32, in a case where the plurality of circumferential sipes 32 is disposed between the width-direction sipe 31 and the center lug groove 16, a plurality of the small blocks 25 is disposed side by side in the tire width direction via the plurality of circumferential sipes 32 located side by side in the tire width direction. In other words, the small block 25 is not only defined by the width-direction sipe 31, the circumferential sipe 32, the center lug groove 16, and the circumferential groove 11, but also the small block 25 with both sides in the tire circumferential direction defined by the width-direction sipes 31 and the center lug groove 16 and both sides in the tire width direction defined by the two circumferential sipes 32 located side by side in the tire width direction is also formed. Accordingly, a plurality of such small blocks 25 is disposed side by side in the tire width direction. As a result, the rigidity of the vicinity of the center lug groove 16 in the center land portion 21 can be more reliably decreased, and thus the snow that has entered the center lug grooves 16 can be more easily discharged.

As the number of circumferential sipes 32 disposed between the width-direction sipe 31 and the center lug groove 16 is increased in this manner, the rigidity of the vicinity of the center lug groove 16 in the center land portion 21 can be decreased. Accordingly, the number of circumferential sipes 32 to be disposed is preferably set as appropriate in accordance with the size of the center land portion 21, physical properties of the tread rubber, and the like. In such a case, the number of circumferential sipes 32 to be disposed may differ between the circumferential sipes 32 disposed on both sides in the tire circumferential direction of the center lug groove 16. Additionally, in a case where the plurality of circumferential sipes 32 is disposed between the width-direction sipe 31 and the center lug groove 16, the distance D in the tire width direction between the circumferential sipe 32 located closest to the circumferential groove 11 to which the width-direction sipe 31 opens and the circumferential groove 11 with respect to the width Wb in the tire width direction of the center land portion 21 is preferably in the range $0.2 \le (D/Wb) \le 0.8$.

Further, in the embodiment described above, the width-direction sipe 31 opens to the circumferential groove 11 defining the outer side in the tire width direction of the center land portion 21. Alternatively, the width-direction sipe 31 may open at one end to the circumferential groove 11 defining the inner side in the tire width direction of the center land portion 21 and terminate at the other end within the center land portion 21.

Furthermore, in the embodiment described above, one of the circumferential sipes 32 located on both sides in the tire circumferential direction of the center lug groove 16 includes the end portion 32*b* separated from the width-direction sipe 31, and the other of the circumferential sipes 32 includes the end portion 32*b* communicating with the width-direction sipe 31; however, the circumferential sipe 32 may be formed in a manner other than the mentioned configuration. For example, the end portion 32*b* of any of the circumferential sipes 32 located on both sides of the center lug groove 16 in the circumferential direction may be separated from the width-direction sipe 31, or the end portion 32*b* of any of the circumferential sipes 32 disposed on both sides of the center lug groove 16 in the circumferential direction may communicates with the width-direction sipe 31.

Additionally, in the embodiment described above, any of the center lug groove 16, the width-direction sipe 31, and the circumferential sipe 32 are linearly formed; however, the center lug groove 16 and the sipe 30 may be bent or curved. In this case, the angle θ of the center lug groove 16, the angles θw, θc, and θd of each sipe 30 are preferably measured by an angle of an imaginary line linearly connecting portions located on end portions of the groove or the sipe 30 in the respective center lines 16*c*, 31*c*, and 32*c*.

Further, in the embodiment described above, the three circumferential grooves 11 are disposed. However, the number of circumferential grooves 11 may be other than three. The number of circumferential grooves 11 may be, for example, two or four or more. Furthermore, for the width-direction sipes 31 and the circumferential sipes 32 in the embodiment described above, the width-direction sipe 31 and the circumferential sipe 32 are disposed on each of both sides of each of all of the center lug grooves 16 in the tire circumferential direction. However, the width-direction sipe 31 and the circumferential sipe 32 are not necessarily disposed on both sides of each of all of the center lug grooves 16 in the tire circumferential direction. For the width-direction sipes 31 and the circumferential sipes 32, the width-direction sipe 31 and the circumferential sipe 32 are disposed on each of both sides in the tire circumferential direction of the center lug groove 16 of at least part of the individual pair of center lug grooves 16 adjacent in the tire circumferential direction, and the small blocks 25 are defined in the center land portion 21 by the width-direction sipes 31 and the circumferential sipes 32. As a result, the snow that has entered the center lug grooves 16 can be easily discharged, and performance on ice and snow can be improved.

In the embodiment described above, although the pneumatic tire 1 is used for description as an example of the tire according to the embodiment of the present technology, the tire according to the embodiment of the present technology may be a tire other than the pneumatic tire 1. The tire according to the embodiment of the present technology may be, for example, a so-called airless tire that can be used without filling a gas.

EXAMPLES

FIGS. 8A and 8B are tables showing results of performance evaluation tests of pneumatic tires. Hereinafter, evaluation tests of performance of the pneumatic tire 1 described above performed on pneumatic tires of Conventional Examples and the pneumatic tires 1 according to the embodiments of the present technology will be described. Performance evaluation tests were performed on tests of performance on ice and snow, which is running performance on icy and snowy road surfaces.

The performance evaluation tests were performed by assembling pneumatic tires 1 each having a tire nominal size of 195/65R15 91T specified by JATMA on JATMA standard rim wheels each having a rim size of 15×6.0J, mounting the test tires on an evaluation vehicle that is a front-wheel passenger vehicle of 1400 cc displacement, adjusting air pressure to 230 kPa for front wheels and to 220 kPa for rear wheels, and then running on the evaluation vehicle.

In evaluation methods for performance on ice and snow, traction characteristics and steering stability were compared in a sensory evaluation by a test driver when the evaluation vehicle on which the test tires were mounted was driven on icy and snowy road surfaces of a test course. The sensory evaluation by the test driver is evaluated and expressed as index values with the Conventional Example described below being assigned the value of 100. For performance on ice and snow, larger index values indicate higher traction characteristics and steering stability on icy and snowy road surfaces and superior performance on ice and snow.

The performance evaluation tests were performed on 18 types of pneumatic tires including a pneumatic tire according to Conventional Example as an example of a conventional pneumatic tire, and Examples 1 to 17 corresponding to the pneumatic tires 1 according to the present technology. Of the tires, in Conventional Example, the width-direction sipe 31 and the circumferential sipe 32 are disposed on each of both sides of part of the center lug grooves 16 in the tire circumferential direction whereas the width-direction sipe 31 and the circumferential sipe 32 are not disposed on each of both sides in the tire circumferential direction of each of the center lug grooves 16 of the pair of center lug grooves 16 adjacent in the tire circumferential direction.

In contrast, in all of Examples 1 to 17 as an example of the pneumatic tire 1 according to the present technology, the width-direction sipe 31 and the circumferential sipe 32 are disposed on each of both sides in the tire circumferential direction of the center lug groove 16 of the individual pair of center lug grooves 16 adjacent in the tire circumferential direction. Additionally, in the pneumatic tires 1 according to Examples 1 to 17, the ratio (Lw/Wb) of the length Lw in the tire width direction of the width-direction sipe 31 to the width Wb in the tire width direction of the center land portion 21, the angle θw of the width-direction sipe 31 with respect to the tire circumferential direction to the angle θ of the center lug groove 16 with respect to the tire circumferential direction, the ratio (K/Hb) of the distance K in the tire circumferential direction between the opening portion 31*a* of the width-direction sipe 31 and the opening portion 16*a* of the center lug groove 16 to the width Hb in the tire circumferential direction of the center lug groove 16, the distance K in the tire circumferential direction between the opening portion 31*a* of the width-direction sipe 31 and the opening portion 16*a* of the center lug groove 16, the angle θc of the circumferential sipe 32 with respect to the width-direction sipe 31, and the ratio (D/Wb) of the distance D from the circumferential groove 11 in the tire width direction of the circumferential sipe 32 to the width Wb in the tire width direction of the center land portion 21 differ from one another.

As a result of the performance evaluation tests by using the pneumatic tires 1, as shown in FIGS. 8A and 8B, it is revealed that the pneumatic tires 1 according to Examples 1 to 17 can exert superior performance on ice and snow compared to Conventional Example. In other words, the pneumatic tires 1 according to Examples 1 to 17 can provide improved performance on ice and snow.

The invention claimed is:

1. A tire, comprising:

a plurality of circumferential grooves extending in a tire circumferential direction;

a plurality of land portions defined by the circumferential grooves; and a plurality of lug grooves extending in a tire width direction;

of the plurality of circumferential grooves, a circumferential groove located on an outermost side in the tire width direction being an outermost circumferential groove, of the plurality of land portions, the land portion located on an inner side of the outermost circumferential groove in the tire width direction being a center land portion, of the plurality of lug grooves, the lug grooves located on an inner side of the outermost circumferential groove in the tire width direction being center lug grooves, one end of the center lug grooves opening to one of the circumferential grooves, an other end of the center lug grooves, which is located on an opposite side of the one end opening to the one of the circumferential grooves, terminates within the center land portion without opening to an other groove or sipe, a width-direction sipe extending in the tire width direction and a circumferential sipe extending in the tire circumferential direction being disposed on an individual side of both sides in the tire circumferential direction of the center lug groove of an individual pair of the center lug grooves adjacent in the tire circumferential direction, the width-direction sipe opening to, at one end, the one of the circumferential grooves to which the center lug groove opens and terminating at an other end within the center land portion, the circumferential sipe opening to the center lug groove at one end and terminating at an other end near the width-direction sipe or communicating with the width-direction sipe, and through sipes being disposed at different pitches, where one end of each of the through sipes communicates with one of the circumferential grooves and an other end of each of the through sipes communicates with an other one of the circumferential grooves.

2. The tire according to claim 1, wherein a length Lw of the width-direction sipe in the tire width direction and a width Wb of the center land portion in the tire width direction have a relationship satisfying $0.3 \leq (Lw/Wb)$.

3. The tire according to claim 2, wherein an angle θw of the width-direction sipe with respect to the tire circumferential direction with respect to an angle θ of the center lug groove with respect to the tire circumferential direction is in a range $(\theta - 1°) \leq \theta w \leq (\theta + 10°)$.

4. The tire according to claim 3, wherein a distance in the tire circumferential direction between an opening portion of the width-direction sipe with respect to the circumferential groove and an opening portion of the center lug groove with respect to the circumferential groove to which the width-direction sipe opens is K, a width of the center lug groove in the tire circumferential direction is Hb, and the width-direction sipe satisfies $(K/Hb) \geq 1$ and $K \leq 10$ mm.

5. The tire according to claim 4, wherein a pitch between the pair of the center lug grooves adjacent in the tire circumferential direction is P, and the width-direction sipe satisfies $(K/P) \leq 0.3$.

6. The tire according to claim 5, wherein an angle θc of the circumferential sipe with respect to the width-direction sipe comprising an end portion terminating near the circumferential sipe or the width-direction sipe with which the circumferential sipe communicates is within a range $55° \leq \theta c \leq 135°$.

7. The tire according to claim 6, wherein a distance D in the tire width direction to the circumferential sipe from the circumferential groove to which the width-direction sipe opens with respect to a width Wb in the tire width direction of the center land portion is in a range $0.2 \leq (D/Wb) \leq 0.8$.

8. The tire according to claim 7, wherein a length Lw of the width-direction sipe in the tire width direction with respect to a length L of the center lug groove in the tire width direction is in a range $0.5 \leq (Lw/L) \leq 0.9$.

9. The tire according to claim 8, wherein the distance D in the tire width direction to the circumferential sipe from the circumferential groove to which the width-direction sipe opens with respect to a length L in the tire width direction of the center lug groove in a range of $0.5 \leq (D/L) \leq 0.9$.

10. The tire according to claim 9, wherein the one of the circumferential grooves to which the width-direction sipe opens defines an outer side in the tire width direction of the center land portion in which the width-direction sipe is disposed.

11. The tire according to claim 1, wherein an angle θw of the width-direction sipe with respect to the tire circumferential direction with respect to an angle θ of the center lug groove with respect to the tire circumferential direction is in a range $(\theta - 1°) \leq \theta w \leq (\theta + 10°)$.

12. The tire according to claim 1, wherein a distance in the tire circumferential direction between an opening portion of the width-direction sipe with respect to the circumferential groove and an opening portion of the center lug groove with respect to the circumferential groove to which the width-direction sipe opens is K, a width of the center lug groove in the tire circumferential direction is Hb, and the width-direction sipe satisfies $(K/Hb) \geq 1$ and $K \leq 10$ mm.

13. The tire according to claim 12, wherein a pitch between the pair of the center lug grooves adjacent in the tire circumferential direction is P, and the width-direction sipe satisfies $(K/P) \leq 0.3$.

14. The tire according to claim 1, wherein an angle θc of the circumferential sipe with respect to the width-direction sipe comprising an end portion terminating near the circumferential sipe or the width-direction sipe with which the circumferential sipe communicates is within a range $55° \leq \theta c \leq 135°$.

15. The tire according to claim 1, wherein a distance D in the tire width direction to the circumferential sipe from the circumferential groove to which the width-direction sipe opens with respect to a width Wb in the tire width direction of the center land portion is in a range $0.2 \leq (D/Wb) \leq 0.8$.

16. The tire according to claim 1, wherein a length Lw of the width-direction sipe in the tire width direction with respect to a length L of the center lug groove in the tire width direction is in a range $0.5 \leq (Lw/L) \leq 0.9$.

17. The tire according to claim 1, wherein a distance D in the tire width direction to the circumferential sipe from the circumferential groove to which the width-direction sipe opens with respect to a length L in the tire width direction of the center lug groove in a range of $0.5 \leq (D/L) \leq 0.9$.

18. The tire according to claim 1, wherein the one of the circumferential grooves to which the width-direction sipe opens defines an outer side in the tire width direction of the center land portion in which the width-direction sipe is disposed.

19. The tire according to claim 1, wherein the through sipes have a linear shape.

20. A tire, comprising:

a plurality of circumferential grooves extending in a tire circumferential direction;

a plurality of land portions defined by the circumferential grooves; and a plurality of lug grooves extending in a tire width direction;

of the plurality of circumferential grooves, a circumferential groove located on an outermost side in the tire width direction being an outermost circumferential groove, of the plurality of land portions, the land portion located on an inner side of the outermost circumferential groove in the tire width direction being a center land portion, of the plurality of lug grooves, the lug grooves located on an inner side of the outermost circumferential groove in the tire width direction being center lug grooves, the center lug grooves opening to the circumferential groove at least at one end, a width-direction sipe extending in the tire width direction and a circumferential sipe extending in the tire circumferential direction being disposed on an individual side of both sides in the tire circumferential direction of the center lug groove of an individual pair of the center lug grooves adjacent in the tire circumferential direction, the width-direction sipe opening to, at one end, the circumferential groove to which the center lug groove opens and terminating at an other end within the center land portion, through sipes being disposed at different pitches, where one end of each of the through sipes communicates with one of the circumferential grooves and an other end of each of the through sipes communicates with an other one of the circumferential grooves, and the circumferential sipe opening to the center lug groove at one end and terminating at an other end near the width-direction sipe, wherein the circumferential sipe does not intersect the width-direction sipe, and the through sipes have a linear shape.

21. A tire, comprising:

a tread portion being point-symmetric with respect to a point on the tire equator line in a plane view, the tread portion comprising, a plurality of circumferential grooves extending in a tire circumferential direction;

a plurality of land portions defined by the circumferential grooves; and a plurality of lug grooves extending in a tire width direction;

of the plurality of circumferential grooves, a circumferential groove located on an outermost side in the tire width direction being an outermost circumferential groove, of the plurality of land portions, the land portion located on an inner side of the outermost circumferential groove in the tire width direction being a center land portion, of the plurality of lug grooves, the lug grooves located on an inner side of the outermost circumferential groove in the tire width direction being center lug grooves, one end of the center lug grooves opening to one of the circumferential grooves, an other end of the center lug grooves, which is located on an opposite side of the one end opening to the one of the circumferential grooves, terminates within the center land portion without opening to an other groove or sipe, a width-direction sipe extending in the tire width direction and a circumferential sipe extending in the tire circumferential direction being disposed on an individual side of both sides in the tire circumferential direction of the center lug groove of an individual pair of the center lug grooves adjacent in the tire circumferential direction, the width-direction sipe opening to, at one end, the one of the circumferential grooves to which the center lug groove opens and terminating at an other end within the center land portion, the circumferential sipe opening to the center lug groove at one end and terminating at an other end near the width-direction sipe or communicating with the width-direction sipe, and no lug grooves connecting to the center lug groove between the one end and the other end of the center lug groove.

22. The tire according to claim 21, wherein the circumferential grooves are defined by straight groove walls parallel to the circumferential direction.

23. A tire, comprising:

a tread portion being point-symmetric with respect to a point on the tire equator line in a plane view, the tread portion comprising, a plurality of circumferential grooves extending in a tire circumferential direction;

a plurality of land portions defined by the circumferential grooves; and a plurality of lug grooves extending in a tire width direction;

of the plurality of circumferential grooves, a circumferential groove located on an outermost side in the tire width direction being an outermost circumferential groove, of the plurality of land portions, the land portion located on an inner side of the outermost circumferential groove in the tire width direction being a center land portion, of the plurality of lug grooves, the lug grooves located on an inner side of the outermost circumferential groove in the tire width direction being center lug grooves, the center lug grooves opening to the circumferential groove at least at one end, a width-direction sipe extending in the tire width direction and a circumferential sipe extending in the tire circumferential direction being disposed on an individual side of both sides in the tire circumferential direction of the center lug groove of an individual pair of the center lug grooves adjacent in the tire circumferential direction, the width-direction sipe opening to, at one end, the one of the circumferential grooves to which the center lug groove opens and terminating at an other end within the center land portion, and the circumferential sipe opening to the center lug groove at one end and terminating at an other end near the width-direction sipe, wherein the circumferential sipe does not intersect the width-direction sipe, and the circumferential grooves are defined by straight groove walls parallel to the circumferential direction.

24. A tire, comprising:

a plurality of circumferential grooves extending in a tire circumferential direction;

a plurality of land portions defined by the circumferential grooves; and a plurality of lug grooves extending in a tire width direction;

wherein one of the circumferential grooves is disposed on a tire equatorial plane, of the plurality of circumferential grooves, a circumferential groove located on an outermost side in the tire width direction being an outermost circumferential groove, of the plurality of land portions, the land portion located on an inner side of the outermost circumferential groove in the tire width direction being a center land portion, of the plurality of lug grooves, the lug grooves located on an inner side of the outermost circumferential groove in the tire width direction being center lug grooves, one end of the center lug grooves opening to one of the circumferential grooves, an other end of the center lug grooves, which is located on an opposite side of the one end opening to the one of the circumferential grooves, terminates within the center land portion without opening to an other groove or sipe, a width-direction sipe extending in the tire width direction and a circumferential sipe extending in the tire circumferential direction being disposed on an individual side of both sides in the tire circumferential direction of the center lug groove of an individual pair of the center lug grooves adjacent in the tire circumferential direction, the width-direction sipe opening to, at one end, the one of the circumferential grooves to which the center lug groove opens and terminating at an other end within the center land portion, the circumferential sipe opening to the center lug groove at one end and terminating at an other end near the width-direction sipe or communicating with the width-direction sipe, and no lug grooves connecting to the center lug groove between the one end and the other end of the center lug groove.

25. The tire according to claim 24, wherein the circumferential grooves are defined by straight groove walls parallel to the circumferential direction.

26. A tire, comprising:

a plurality of circumferential grooves extending in a tire circumferential direction;

a plurality of land portions defined by the circumferential grooves; and a plurality of lug grooves extending in a tire width direction;

wherein one of the circumferential grooves is disposed on a tire equatorial plane, of the plurality of circumferential grooves, a circumferential groove located on an outermost side in the tire width direction being an outermost circumferential groove, of the plurality of land portions, the land portion located on an inner side of the outermost circumferential groove in the tire width direction being a center land portion, of the plurality of lug grooves, the lug grooves located on an inner side of the outermost circumferential groove in the tire width direction being center lug grooves, the center lug grooves opening to the circumferential groove at least at one end, a width-direction sipe extending in the tire width direction and a circumferential sipe extending in the tire circumferential direction being disposed on an individual side of both sides in the tire circumferential direction of the center lug groove of an individual pair of the center lug grooves adjacent in the tire circumferential direction, the width-direction sipe opening to, at one end, the circumferential groove to which the center lug groove opens and terminating at an other end within the center land portion, and the circumferential sipe opening to the center lug groove at one end and terminating at an other end near the width-direction sipe, wherein the circumferential sipe does not intersect the width-direction sipe, and the circumferential grooves are defined by straight groove walls parallel to the circumferential direction.

* * * * *